United States Patent [19]
Miyaguchi

[11] Patent Number: 5,731,672
[45] Date of Patent: Mar. 24, 1998

[54] CONTROL APPARATUS OF DC SERVO MOTOR

[75] Inventor: Ryuichi Miyaguchi, Kawasaki, Japan

[73] Assignee: Fujitsu Limited, Kawasaki, Japan

[21] Appl. No.: 439,492

[22] Filed: May 12, 1995

[30] Foreign Application Priority Data

Jul. 29, 1994 [JP] Japan ................... 6-177365

[51] Int. Cl.$^6$ ........................................ H02P 1/22
[52] U.S. Cl. .................. 318/293; 318/599; 318/6; 388/811
[58] Field of Search ................... 318/254, 138, 318/439, 432, 282, 811, 599, 798, 803, 6, 293, 257, 291, 283, 284, 286; 363/41, 98; 388/804, 811

[56] References Cited

U.S. PATENT DOCUMENTS

| | | | |
|---|---|---|---|
| 4,104,570 | 8/1978 | Hamby et al. | 318/798 |
| 4,423,363 | 12/1983 | Clark et al. | 318/375 |
| 4,528,486 | 7/1985 | Flaig et al. | 318/254 |
| 4,644,234 | 2/1987 | Nola | 318/254 |
| 4,843,297 | 6/1989 | Landino et al. | 318/811 |
| 4,904,919 | 2/1990 | McNaughton | 318/798 |
| 5,350,988 | 9/1994 | Le | 318/811 |

*Primary Examiner*—John W. Cabeca
*Attorney, Agent, or Firm*—Greer, Burns & Crain, Ltd.

[57] ABSTRACT

When a processor sets a current instruction value and a rotating direction of a motor, two analog instruction signals of a positive polarity and a negative polarity are obtained after completion of a D/A conversion, the analog instruction signal of the negative polarity is selected by an instruction in the CW direction, and the analog instruction signal of the positive polarity is selected by the instruction in the CCW direction. The analog instruction signal of the polarity selected is added to a motor current detection signal which was negatively fed back by an adding circuit, so that an analog deviation signal is derived. A pulse width modulating circuit section outputs a PWM pulse in the CW direction for the negative polarity of the analog deviation signal and outputs a PWM pulse in the CCW direction for the positive polarity. At the same time, a CW switching signal is outputted for the negative polarity of the analog deviation signal and a CCW direction switching signal is outputted for the positive polarity. By inverting a detection signal of current detecting resistors serially connected to the motor, a negative feedback is certainly performed.

8 Claims, 14 Drawing Sheets

FIG. 3A  PHASE SIGNAL E120

FIG. 3B  INPUT OF COMPARING CIRCUIT 342

FIG. 3C  PWM PULSE SIGNAL E105

FIG. 3D  INPUT OF COMPARING CIRCUIT 344

CONTROL APPARATUS OF DC SERVO MOTOR

BACKGROUND OF THE INVENTION

The invention relates to a DC motor control apparatus for feedback controlling a DC servo motor by a pulse driving by a pulse width modulation and, more particularly, to a DC motor control apparatus for feedback controlling on the basis of an instruction from a processor.

In various industrial fields including information processes, in order to accurately make a mechanical driving mechanism operative by a motor driving, a processor and a motor driving circuit are combined and a control for raising a driving efficiency of a motor and a precision is requested. To make the driving mechanism to be controlled operative in accordance with instructions from the processor, there is provided a servo control circuit using a sensor for informing a state of the driving mechanism, an amplifying circuit for transferring an instruction of the processor to the driving mechanism, and a servo motor for accurately transferring an electric energy to a mechanism section. In this case, a feedback system must form a negative feedback for an instruction value from the processor. In case of performing a servo control, when a disturbance, a phase deviation, or the like occurs, the loop system enters an unstable state such as an oscillation or the like and the control cannot be executed at a high precision. Therefore, it is necessary to raise a response speed of the feedback system and to stabilize the operation of the feedback system, thereby to suppress a speed fluctuation and a position fluctuation.

FIG. 1 shows a conventional DC motor control apparatus. An instruction value from a processor 310 to a DC motor 330 is converted to an analog instruction signal E101 by a D/A converting circuit 312. The analog instruction signal E101 is added to a current feedback signal E102 by an adding circuit 314, so that a deviation signal (servo error signal) E103 is derived. The deviation signal is converted to a pulse width modulation (PWM) signal E104 of a duty according to a level by a pulse width modulating circuit (PWM circuit) 316 and is outputted to a logic circuit 318. On the basis of a direction/mode switching signal E110 from the processor 310, the logic circuit 318 outputs a clockwise (hereinafter, referred to as a CW direction) or counterclockwise (hereinafter, referred to as a CCW direction) drive control signal E105 to a power amplifier 320. The power amplifier 320 is constructed by bridge connecting four devices such as FETs or the like. One of a pair of devices arranged at opposite positions is driven by a PWM pulse and the other is driven by a direction switching signal, thereby supplying a drive current to the DC motor 330 so as to be rotated in the CW or CCW direction. A relay circuit 324 and an overcurrent detecting circuit 326 are serially connected to the power amplifier 320 for a power source 322. Further, a current detecting resistor 332 is connected to the ground side. The relay circuit 324 is controlled by a relay drive signal E100 from the processor 310, thereby turning on or off a power supply. When a motor overcurrent is detected, the overcurrent detecting circuit 326 forcedly turns off the relay circuit 324 and outputs a current alarm signal E113 to the processor 310. A current detecting circuit 334 inputs a detection voltage of the current detecting resistor 332 and outputs a current detection signal E106. The current detection signal E106 is directly inputted to an analog switch 336 and is inputted to the analog switch 336 as an inversion signal E107 inverted by an inverting amplifier 338. The analog switch 336 switches so that the current feedback signal E102 is always negatively fed back for the instruction signal E101 to the adding circuit 314. As for such a switching, a polarity of the deviation signal E103 from the adding circuit 314 is discriminated by a polarity judging circuit 340 and a code switching signal E111 is outputted to the analog switch 336 via the logic circuit 318, thereby switching. Namely, when the deviation signal E103 has a plus polarity, the current detection signal E106 always has a plus polarity. Therefore, the minus polarity signal E107 inverted by the inverting amplifier 338 is selected by the analog switch 336 and is negatively fed back. On the contrary, when the deviation signal E103 has a minus polarity, since the current detection signal E106 always has a plus polarity, it is selected as it is by the analog switch 336 and is negatively fed back.

FIG. 2 shows the details of the PWM circuit 316 in FIG. 1. The deviation signal E103 from the adding circuit 314 is supplied to a comparing circuit 342. The signal E103 is inverted by an inverting amplifier 346 and is inputted as a signal E112 to a comparing circuit 344. A ramp waveform signal E123 obtained by a constant current charge into a capacitor 350 by a constant current circuit 348 is supplied to the other inputs of the comparing circuits 342 and 344. A flip-flop 352 is set by a phase signal E120 for setting a repetitive period of a PWM pulse and is reset by a comparison output E124 of the comparing circuit 342 or by a comparison output E125 of the comparing circuit 344 and generates a PWM drive pulse signal E105 from a *Q terminal (inverting Q terminal). A Q output is used to discharge reset the capacitor 350.

The PWM circuit 316 of FIG. 2 operates in accordance with timing charts of FIGS. 3A to 3D. It is now assumed that the deviation signal E103 from the adding circuit 314 has a plus polarity as shown in FIG. 3B. In this instance, the comparing circuit 342 effectively operates and the ramp waveform signal E123 rises by the start of the charging to the capacitor 350 synchronized with a leading edge of the phase signal E120 in FIG. 3A. When the ramp waveform signal E123 reaches the deviation signal E103, a comparison output of the comparing circuit 342 is derived. Therefore, the flip-flop 352 which was set in response to a leading edge of the phase signal E120 is reset by the comparison output of the comparing circuit 342 and generates the PWM drive pulse signal E105 in FIG. 3C having a duty ratio according to the level of the deviation signal E103 at that time. In this instance, as shown in FIG. 3D, since the comparing circuit 344 compares the deviation signal E112 of the minus polarity due to the inversion and the ramp waveform signal E123, no comparison output is derived.

In such a conventional DC motor control apparatus, since the instruction value from the processor is D/A converted to the analog instruction signal of a single polarity (positive polarity) and a feedback control is performed, a feedback signal is always set to be negative for the analog instruction signal. Therefore, the polarity of the deviation signal has to be always judged and the analog switch has to be switched so as to be a negative signal in which the polarity was changed. However, there is a delay time depending on the circuit operation until the analog switch is switched after the polarity was judged. Since the signal is added to the instruction signal without changing the code and polarity for such a delay time, there is a problem such that a positive feedback is performed and the control becomes unstable.

SUMMARY OF THE INVENTION

According to the invention, there is provided a DC motor control apparatus in which in case of feedback controlling a DC motor by a PWM pulse driving, a hardware is constructed so as to always perform a negative feedback without needing a circuit switching and in which a size is small, an electric power consumption is small, the operation is stable, and a response speed is high.

First, a motor control circuit of the invention is constructed by a processor, a D/A converting circuit, and a driver circuit. The processor instructs various kinds of controls at the time of the motor driving including a motor current instruction value. The D/A converting circuit converts a digital signal of the current instruction value from the processor to an analog instruction signal of a positive polarity. The analog instruction signal of the positive polarity is inverted by an analog signal inverting circuit of the positive polarity and becomes an analog instruction signal of a negative polarity. A selecting circuit selects the negative polarity analog instruction signal from the D/A converting circuit by an instruction in one rotating direction, for example, CW direction from the processor. The selecting circuit selects the negative polarity analog instruction signal from the inverting circuit by an instruction in another rotating direction, for example, CCW direction from the processor. Thus, the analog instruction signal denotes the rotating direction by the polarity and denotes the current instruction value by its value. Therefore, there is no need to instruct the rotating direction by subsequent circuits. An adding circuit adds the analog instruction signal of the negative or positive polarity from the selecting circuit and a negative feedback signal detected by a motor current detecting circuit and outputs a deviation signal. When the deviation signal has the negative polarity, a pulse width modulating circuit section (PWM circuit section) generates a first pulse width modulation signal of a duty ratio according to a negative polarity level of the deviation signal and outputs as a CW drive pulse signal. When the deviation signal has the positive polarity, the PWM circuit section generates a second pulse width modulation signal of a duty ratio according to the positive polarity level of the deviation signal and outputs as a CCW drive pulse signal. A rotating direction setting circuit outputs a switching signal in the CW direction when the negative polarity of the deviation signal is detected and outputs a switching signal in another CCW direction when the positive polarity of the deviation signal is detected. A motor driving circuit (power amplifier) is supplied with an electric power from a DC power source and drives a DC motor by the switching operation based on the PWM drive pulse signal of the PWM circuit section and the switching signal of the rotating direction setting circuit.

The pulse width modulating circuit section comprises: a repetitive period setting circuit for generating a phase signal to set a repetitive period of the pulse width modulation signal synchronously with a clock signal; a ramp waveform forming circuit for generating a ramp waveform signal of a positive polarity at every predetermined period synchronized with the phase signal; and an inverting circuit for inverting a ramp waveform signal of the ramp waveform forming circuit and outputting a ramp waveform signal of a negative polarity. The negative polarity ramp waveform signal of the inverting circuit is compared with the deviation signal by a first comparing circuit. A first comparison output is generated when the negative polarity ramp waveform signal exceeds the negative polarity level of the deviation signal. The positive polarity ramp waveform signal of the ramp waveform forming circuit is compared with the deviation signal by a second comparing circuit. A second comparison output is generated when the positive polarity ramp waveform signal exceeds the positive polarity level of the deviation signal. A first pulse generating circuit using a flip-flop generates a first pulse width control signal that is set by the phase signal and is reset by the first comparison output and is used for pulse driving in the CW direction. A second pulse generating circuit using a flip-flop generates a second pulse width control signal that is set by the phase signal and is reset by the second comparison output and is used for pulse driving in the CCW direction. The phase signal is delayed by a delay circuit by only a delay time corresponding to a predetermined number of clocks. The first and second pulse generating circuits are set by the delayed phase signal and are reset by an earlier one of the first and second comparison outputs after the setting and the phase signal. Thus, a capacitor is perfectly discharged until the next period, thereby allowing the ramp waveform signal to certainly start from the zero voltage.

The ramp waveform forming circuit has a capacitor which is charged by a constant current from a constant current circuit and which generates a ramp voltage. The discharging operation of the capacitor is started by a resetting circuit at a timing of the delayed phase signal. When the first or second comparison output is derived, the capacitor is discharge reset. When no comparison output is obtained, the capacitor is discharge reset at a timing of the next phase signal.

The motor driving circuit is a bridge-type driving circuit in which two sets of circuits each comprising a pair of switching devices which are serially connected are connected in parallel. A pair of switching devices arranged at diagonal positions are controlled by the first PWM driving pulse signal from the PWM circuit section and the first switching signal from the direction setting circuit, thereby supplying a current in the CW direction to the DC motor. Another pair of switching devices arranged at the other diagonal positions are controlled by the second pulse width control signal and the second direction setting signal, thereby supplying a current in the opposite CCW direction to the DC motor.

A logic circuit of the PWM circuit section has a switching circuit for simultaneously on/off driving both of the pair of switching devices arranged at the diagonal positions of the driving circuit by the first or second PWM driving pulse signal when a braking mode is instructed from the processor. At the same time, a current in the opposite direction is supplied to the motor for an OFF period in the simultaneous driving of the pair of switching devices, thereby forming a regenerative braking circuit. For this purpose, diodes are connected in parallel in the opposite direction to each of the switching devices.

Further, a voltage current monitoring circuit for monitoring a power source voltage which is supplied to the DC motor is provided. The processor sets a rotational speed of the DC motor on the basis of the monitoring result of the power source voltage.

When an output of an overcurrent circuit to detect an overcurrent flowing in the DC motor continues in excess of a predetermined time, the voltage current monitoring circuit outputs a current alarm signal to the processor. Further, the voltage current monitoring circuit turns on/off the power supply to the DC motor by an instruction from the processor. Further, a circuit to shut off the power supply to the DC motor in response to a current alarm signal is provided.

According to such a DC motor control apparatus of the invention, when the processor sets the motor current instruction value and the motor driving direction, two analog instruction signals of the positive polarity and negative polarity are outputted after completion of the D/A conversion. When the processor instructs the CW direction, for example, the analog instruction signal of the negative polarity is selected. On the contrary, when the processor instructs the CCW direction, the analog instruction signal of the positive polarity is selected. The analog instruction signal of the selected polarity is added to the motor current detection signal which was negatively fed back and becomes an analog deviation signal. When the analog deviation signal has the negative polarity, the pulse width modulated CW direction drive pulse is outputted. When the analog deviation signal has the positive polarity, the pulse width modulated CCW direction drive pulse is likewise outputted. When the negative polarity of the analog deviation signal is detected, the switching signal in the CW direction is outputted. On the contrary, when the positive polarity of the analog deviation signal is detected, the switching signal in the CCW direction is outputted. The motor driving circuit using the bridge circuit supplies a drive current for rotating the DC motor in the CW direction by the on/off operations of the switching devices such as FETs, transistors, or the like by the CW driving pulse signal due to the pulse width modulation and the switching signal in the CW direction. On the contrary, the motor driving circuit using the bridge circuit supplies a drive current for rotating the DC motor in the CCW direction by the on/off operations of the switching devices such as FETs, transistors, or the like by the CCW driving pulse signal due to the pulse width modulation and the switching signal in the CCW direction. Thus, the rotating direction of the motor is determined by a magnitude of the feedback signal to the instruction signal. Since a resistor is serially inserted to the motor, a sign of the motor current detection signal is changed by the rotating direction of the motor. In the ordinary motor driving, a slightly small current detection signal is fed back for the instruction signal. Therefore, the polarity of the deviation signal is generally the same as the polarity of the instruction signal. Accordingly, by feeding back the inversion signal of the current detection signal which is serially connected to the motor, the negative feedback is certainly performed. The polarity of the current detection signal which is fed back doesn't need to be switched in accordance with the polarity of the deviation signal.

The power source voltage to the motor is checked. For example, the power source voltage of the apparatus is compared with a predetermined reference voltage. When the power source voltage is lower than the reference voltage, a power check is informed to the processor. That is, when the motor rotates, a counter electromotive voltage is generated in proportion to a rotational speed of the motor. To rotate the motor at a high speed, a higher power source voltage is needed. Therefore, by recognizing a state of the power source voltage by the processor, the processor can judge the highest rotational speed of the motor. Further, an overcurrent of the motor is detected and is alarmed to the processor. For example, a relay circuit to turn on/off the power supply is forcedly turned off. Since such an overcurrent detection includes an erroneous operation due to noises or the like, only when an overcurrent detection state continues for a predetermined time that is defined by the number of clocks, such current alarm notification and power shut-off are executed.

On the other hand, the DC motor of the invention is a reel motor provided for each of a pair of reels for running a magnetic tape by a magnetic tape unit. The processor has a tape tension control section for instructing a current to each reel motor so as to apply a predetermined tape tension. A reference value setting circuit to set a reference value of the tape tension is provided. A comparing circuit for comparing the reference value of the tape tension and an actual tape tension value detected by the sensor and outputting a comparison result regarding whether the actual tape tension value has exceeded the reference value or not to a tape tension control section is also provided. Further, a fluctuation width setting circuit to set a fluctuation width of the tape tension to the reference tape tension value is provided. A judging circuit judges whether the actual tape tension value detected by the sensor lies within a range of the fluctuation width or not. A judgment result is outputted to the tape tension control section. That is, the invention relates to a tension control of the reel motors which are used in the magnetic tape unit. In the tension control, the reel motor on the tape take-up side is driven in the normal mode and the reel motor on the tape feeding side is driven in the braking mode, thereby obtaining a tape tension. In order to control the tape tension so as to be constant by the processor, a reference value and a fluctuation width of the tape tension are set and are compared with the actual tape tension value detected by the sensor, and whether the actual tape tension value has exceeded the reference value or not and whether it lies within the fluctuation width or not are notified to the processor. By receiving such information, the current instruction value is controlled and the tape tension can be held constant.

The above and other objects, features, and advantages of the present invention will become more apparent from the following detailed description with reference to the drawings.

DETAILED DESCRIPTION OF THE PREFERRED EMBODIMENT

[PWM pulse driving]

Figure 1:
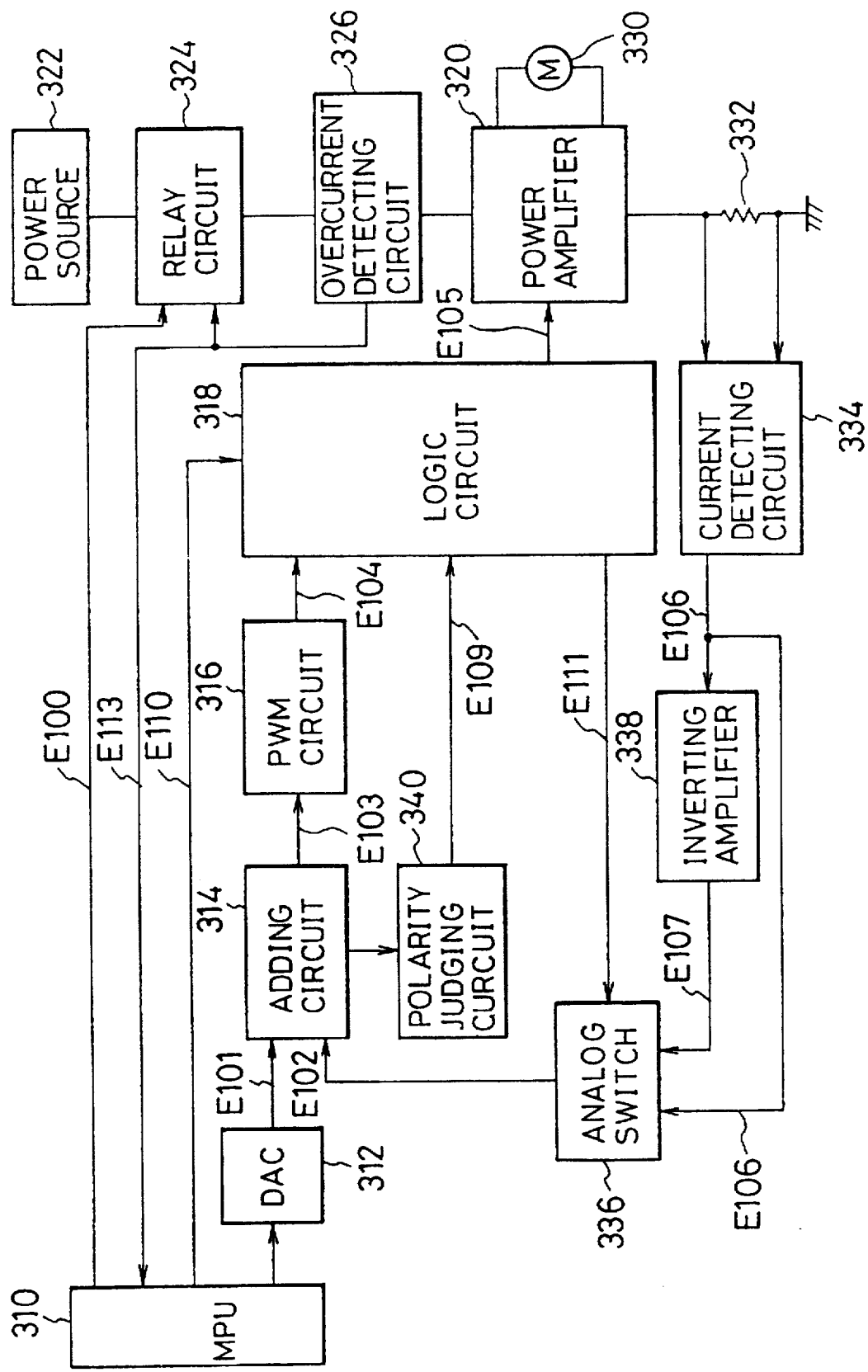
FIG. 1 is a block diagram of a conventional apparatus.
Figure 2:
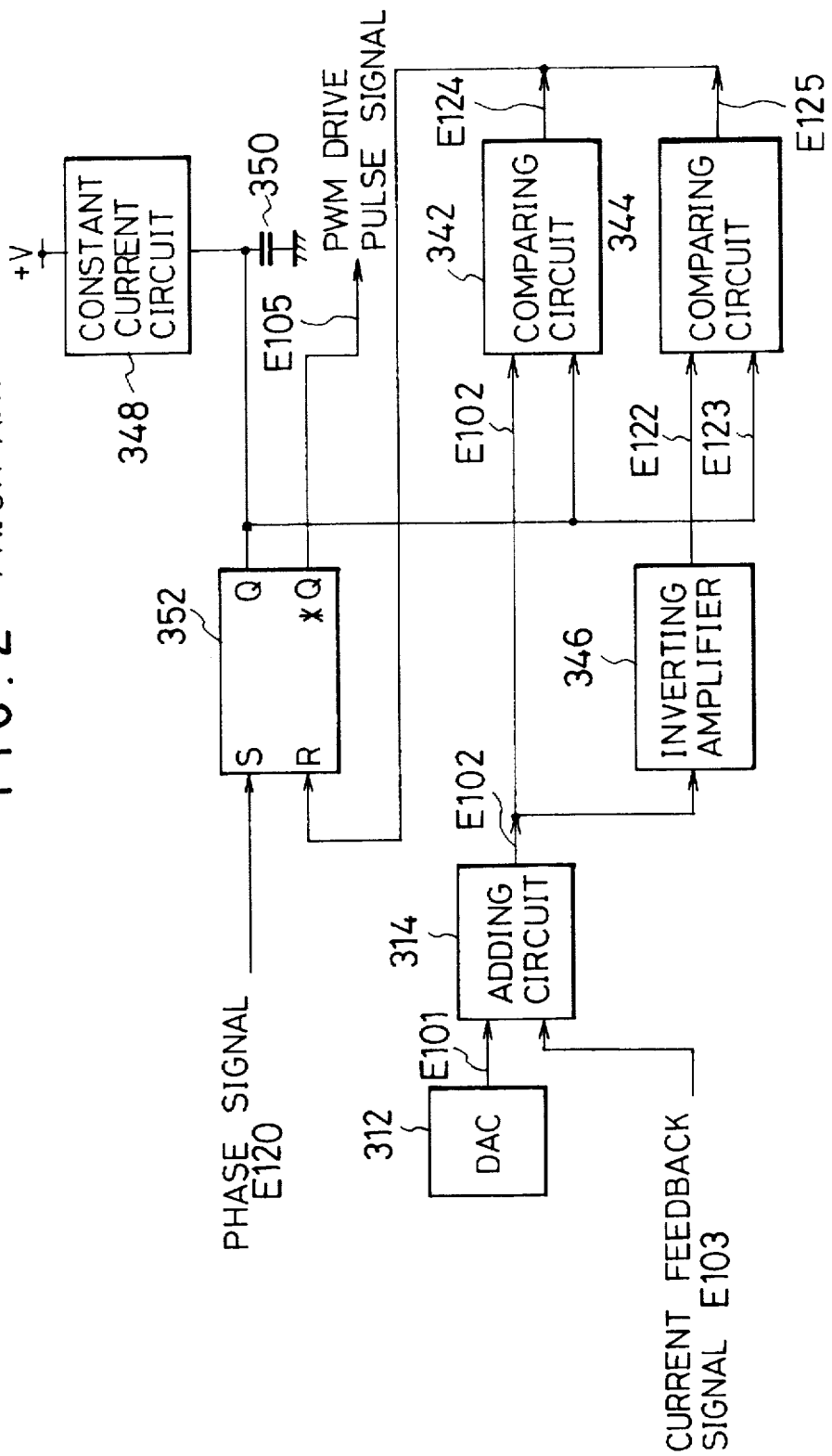
FIG. 2 is a block diagram of a pulse width modulating circuit in FIG. 1.
Figure 3:
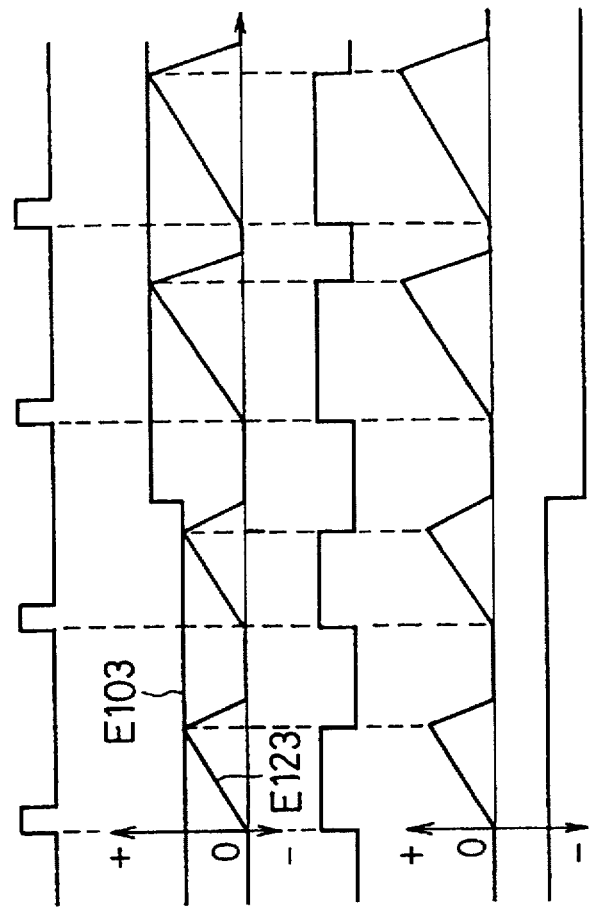
FIGS. 3A to 3D are timing charts for a pulse width modulating operation of the circuit of FIG. 2.
Figure 4:
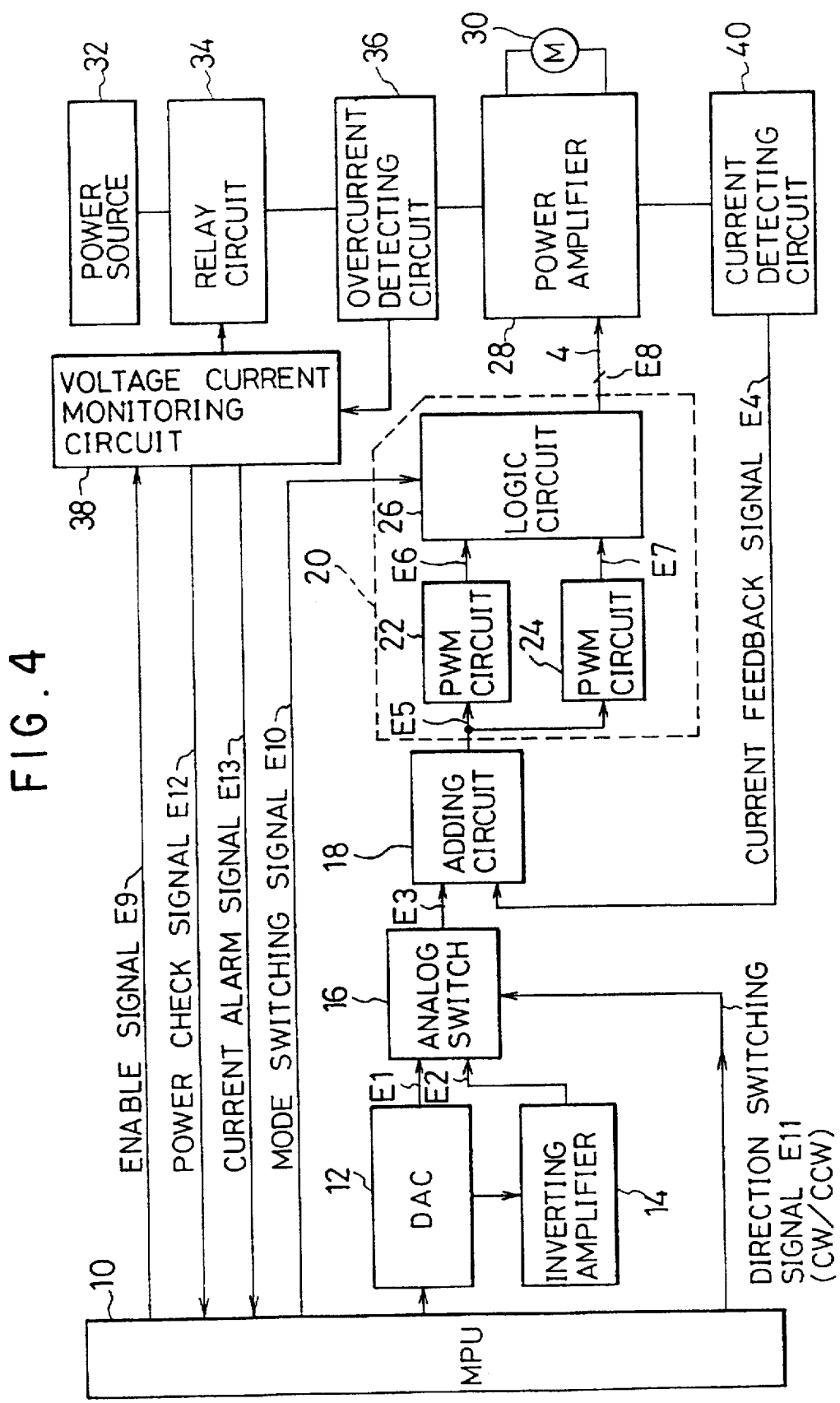
FIG. 4 is a circuit block diagram of an embodiment of the invention.

FIG. 4 shows an embodiment of a DC motor driving apparatus of the invention. A processor 10 outputs a digital instruction value Di (current instruction value) which is necessary for motor control, an enable signal E9, a mode switching signal E10, and a direction switching signal E11. The enable signal E9 turns on/off a power supply to a motor. The mode switching signal E10 instructs the switching between a normal mode and a braking mode. The direction switching signal E11 instructs the switching between the CW direction and the CCW direction. As a processor 10, a digital signal processor (DSP) can be used as well as an MPU. The following embodiment will be described with respect to a case of using a microprocessor (MPU) as an example. The digital instruction value Di from the MPU 10 is converted to an analog instruction signal E1 by a D/A converting circuit 12. The analog instruction signal E1 converted by the D/A converting circuit 12 is supplied to an inverting amplifier 14 and is converted to an analog instruction signal E2 whose polarity was inverted to the negative polarity. Therefore, the positive polarity analog instruction signal E1 from the D/A converting circuit 12 and the negative polarity analog instruction signal E2 from the inverting amplifier 14 are inputted to an analog switch 16. The analog switch 16 is switched by the direction switching signal E11 from the MPU 10. For example, in case of an instruction in the CW direction, the analog switch 16 selects the negative polarity analog instruction signal E2 from the inverting amplifier 14 and outputs as a signal E3. In case of an instruction in the CCW direction, the analog switch 16 selects the positive polarity analog instruction signal E1 from the D/A converting circuit 12 and outputs as a signal E3. An adding circuit 18 adds a current feedback signal E4 which is negatively fed back to the analog instruction signal E3 of the positive or negative polarity selected by the analog switch 16 and outputs an analog deviation signal E5. For the polarity of the analog instruction signal E3 to the adding circuit 18, the current feedback signal E4 of a DC motor 30 which is detected by a current detecting circuit 40 certainly has the polarity that is negatively fed back. That is, in case of the negative polarity analog instruction signal E3 which is obtained by the instruction in the CW direction, the polarity of the current feedback signal E4 is the positive polarity. For the positive polarity analog instruction signal E3 which is obtained by an instruction in the CCW direction, the current feedback signal E4 has the negative polarity. As for the polarity of the current feedback signal E4, since a current detecting resistor of the current detecting circuit 40 is serially connected to the DC motor 30, the current direction in the CW direction and the current direction in the CCW direction are opposite and the polarity that is negatively fed back is certainly derived.

The analog deviation signal E5 from the adding circuit 18 is supplied to a pulse width modulating circuit section (PWM circuit section) 20. The PWM circuit section 20 includes two PWM circuits 22 and 24. The PWM circuit 22 effectively operates in the case where the analog deviation signal E5 has a negative polarity and outputs a PWM pulse signal E6 to drive the DC motor 30 in the CW direction. The PWM circuit 24 effectively operates in the case where the analog deviation signal E5 has the positive polarity and outputs a PWM pulse signal E7 to drive the DC motor 30 in the CCW direction. A logic circuit 26 directly outputs the PWM pulse signal E6 or E7 from the PWM circuit 22 or 24 to a power amplifier 28 as it is and forms a switching signal in the CW direction or a switching signal in the CCW direction obtained on the basis of the polarity of the analog deviation signal E5. The logic circuit 26 supplies the switching signal in the CW or CCW direction to the power amplifier 28 together with the corresponding PWM pulse signal E6 or E7. Therefore, as a control signal E8 which is outputted from the logic circuit 26 to the power amplifier 28, there are the following four signals:

I. PWM pulse signal E6 in the CW direction
II. PWM pulse signal E7 in the CCW direction
III. Switching signal in the CW direction
IV. Switching signal in the CCW direction Among the four signals, the signals I and III are effective in case of an instruction in the CW direction and the signals II and IV are effective in case of an instruction in the CCW direction as will be explained in detail hereinlater. A relay circuit 34 and an overcurrent detecting circuit 36 are serially connected to the power amplifier 28 from a power source 32. Further, a voltage current monitoring circuit 38 is provided. The relay circuit 34 receives the enable signal E9 from the MPU 10 via the voltage current monitoring circuit 38 and turns on the supply of a DC power source to the DC motor 30. The overcurrent detecting circuit 36 detects that an overcurrent exceeding a specific value flowed in the DC motor 30 by an overcurrent detecting resistor. The voltage current monitoring circuit 38 monitors the power source voltage of the power source 32 and judges the overcurrent based on a detection output of the overcurrent detecting circuit 36. When there is an abnormality in the power source voltage, a power check signal E12 is outputted to the MPU 10. When an overcurrent is detected, a current alarm signal E13 is outputted.

Figure 5:
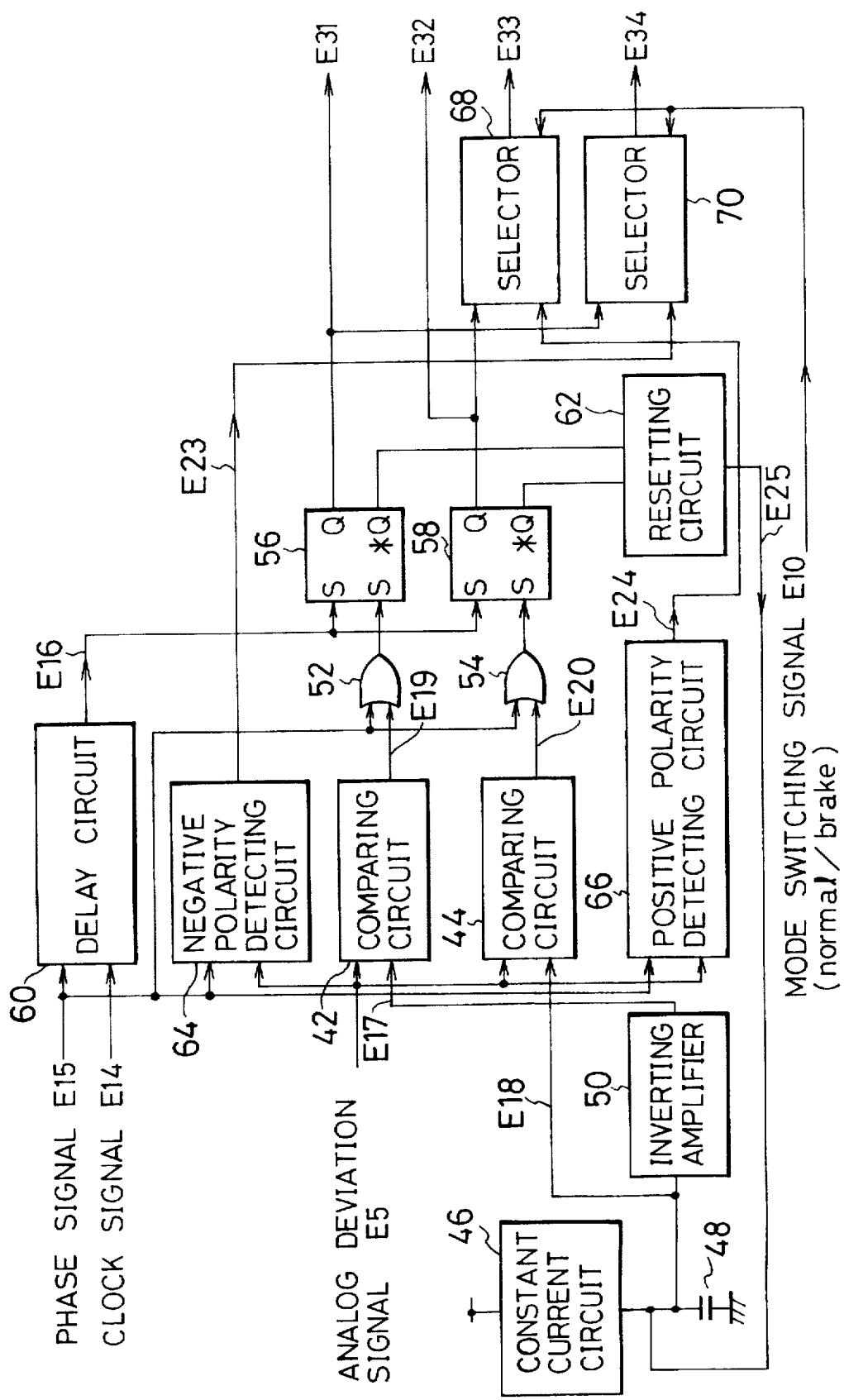
FIG. 5 is a circuit diagram of an embodiment of a pulse width modulating circuit section in FIG. 4.

FIG. 5 shows an embodiment of the PWM circuit section 20 in FIG. 4. The analog deviation signal E5 from the adding circuit 18 locating at the front stage is supplied to comparing circuits 42 and 44. A ramp waveform signal to produce a PWM pulse is supplied to the other inputs of the comparing circuits 42 and 44. In the embodiment, the ramp waveform signal is produced by a constant current charge of a capacitor 48 by a constant current circuit 46. A ramp waveform signal E18 of the positive polarity by the constant current charge of the capacitor 48 is inputted to the comparing circuit 44. On the other hand, a negative polarity ramp waveform signal E17 in which the polarity is set to the negative polarity by inverting the positive polarity ramp waveform signal E18 by an inverting amplifier 50 is inputted to the comparing circuit 42. The comparing circuit 42 generates a PWM pulse signal in the CW direction based on the negative polarity analog deviation signal E5 that is inputted by the instruction in the CW direction. On the other hand, the comparing circuit 44 forms a PWM pulse signal in the CCW direction based on the positive polarity analog deviation signal E5 that is inputted by the instruction in the CCW direction. A comparison output signal E19 of the comparing circuit 42 is supplied to a reset terminal (R) of a flip-flop 56 through an OR gate 52. A comparison output signal E20 of the comparing circuit 44 is also supplied to a reset terminal R of a flip-flop 58 through an OR gate 54. An output signal E16 from a delay circuit 60 is supplied to set terminals (S) of the flip-flops 56 and 58. A clock signal E14 and a phase signal E15 are inputted to the delay circuit 60. The phase signal E15 is a sync signal for setting a repetitive period of the PWM pulse in the pulse width modulation. In the invention, the phase signal E15 is not directly supplied to the set terminals (S) of the flip-flops 56 and 58 but are supplied to the delay circuit 60, by which they are delayed by a time corresponding to a predetermined number of clocks based on the clock signal E14 and becomes the delayed phase signal E16. The delayed phase signal E16 is supplied to the set terminal (S) of the flip-flop 56. The flip-flops 56 and 58 are set in response to a leading edge at the H level of the delayed phase signal E16 from the delay circuit 60, so that a (Q) output is set to the H level. The flip-flops 56 and 58 are reset by the subsequent comparison output signals E19 and E20 of the comparing circuits 42 and 44 which are derived through the OR gates 52 and 54, so that the (Q) output is set to the L level. Output signals of the flip-flops 56 and 58 becomes a PWM pulse signal having a duty ratio according to the level of the inputted analog deviation signal E5. *Q outputs of the flip-flops 56 and 58 are supplied to a resetting circuit 62. The resetting circuit 62 outputs a reset signal E25 to a node of the capacitor 48 and constant current circuit 46. For a period of time during which the *Q output of the flip-flop 56 or 58 is at the H level, the resetting circuit 62 sets the reset signal E25 to the L level, thereby forming a discharge resetting state of the capacitor 48.

Further, a negative polarity detecting circuit 64 and a positive polarity detecting circuit 66 which function as a rotating direction setting circuit are provided. The negative polarity detecting circuit 64 detects that the analog deviation signal E5 has the negative polarity, and outputs a CW switching signal E23 that is used for switching of the CW direction. The positive polarity detecting circuit 66 detects the positive polarity of the analog deviation signal E5 and outputs a CCW switching signal E24 to instruct the switching in the CCW direction. Selectors 68 and 70 are provided at the final stage and are switched by the mode switching signal E10. A PWM pulse signal E32 in the CCW direction from the flip-flop 58 and the switching signal E24 in the CCW direction from the positive polarity detecting circuit 66 are inputted to the selector 68. A PWM pulse signal E31 in the CW direction from the flip-flop 56 and the switching signal E23 in the CW direction from the negative polarity detecting circuit 64 are inputted to the selector 70. When an instruction by the mode switching signal E10 indicates a normal mode, selectors 68 and 70 select the switching signal E24 in the CCW direction and the switching signal E23 in the CW direction and output as control signals E33 and E34. On the other hand, when the braking mode is instructed by the mode switching signal E10, the selector 68 selects the PWM pulse signal E32 in the CCW direction from the flip-flop 58 and outputs as a control signal E33. The selector 70 also selects the PWM pulse signal E31 in the CW direction from the flip-flop 56 and outputs as a control signal E34. That is, in the braking mode, both of the control signals E31 and E34 which are used for driving in the CW direction become the PWM pulse signals in the CW direction. With respect to the CCW direction as well, both of the control signals E32 and E33 become the PWM pulse signals in the CCW direction in the braking mode.

Figure 6:
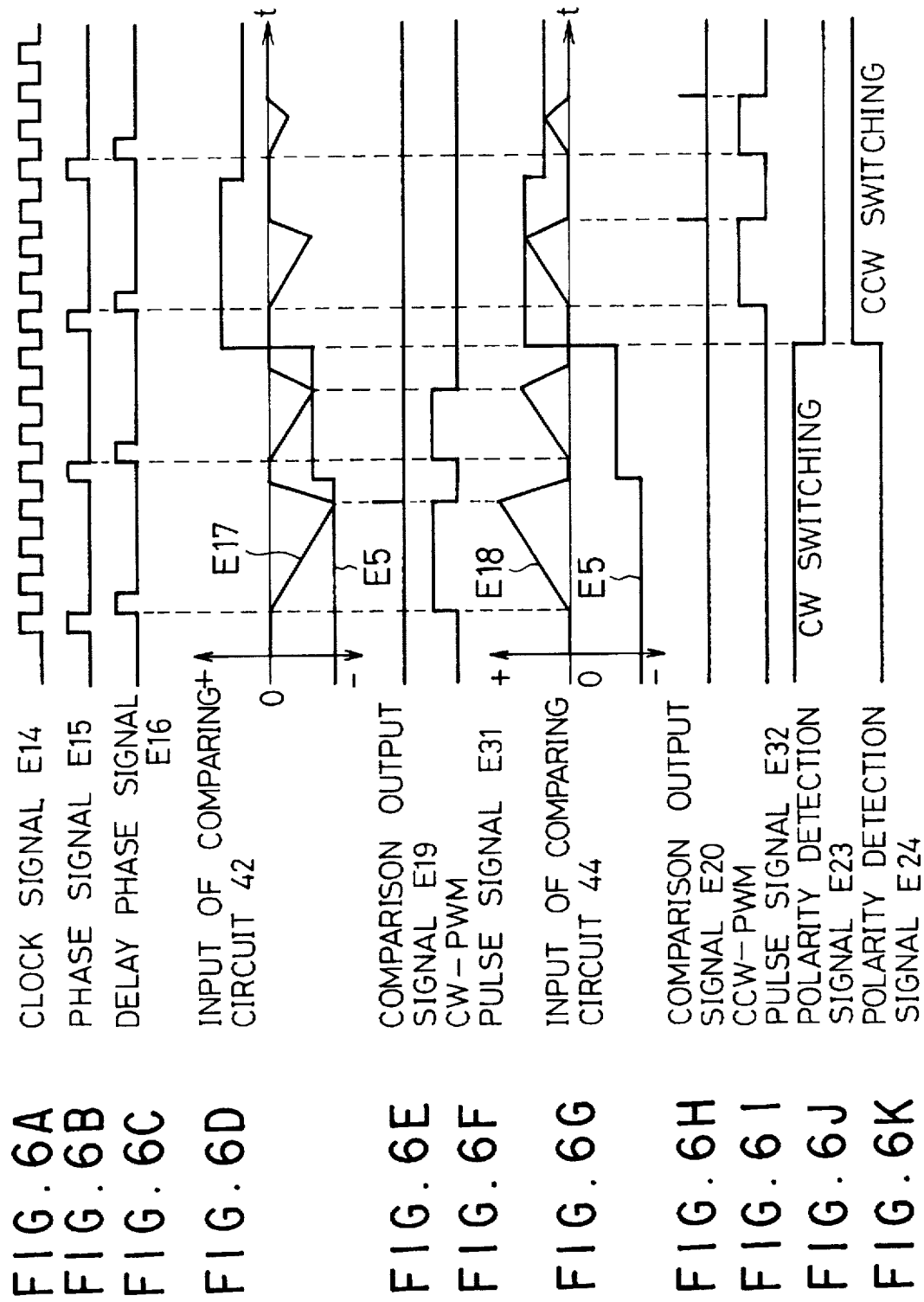
FIGS. 6A to 6K are timing charts for a pulse width modulating operation in FIG. 5.

FIGS. 6A to 6K show the pulse width modulating operation of FIG. 5. First, for a clock signal E14 in FIG. 6A, the phase signal E15 of FIG. 6B having four periods is inputted in the embodiment. The phase signal E15 is delayed by the delay circuit 60 and becomes the delayed phase signal E16 which was delayed, for instance, by only ½ of the clock period of FIG. 6C. In the timing chart, although the phase signal E15 has been delayed by only ½ of the clock period for simplicity of explanation, it can be also delayed by only a time corresponding to a proper number of clocks as necessary. Like an input of the comparing circuit 42 in FIG. 6D and an input of the comparing circuit 44 in FIG. 6G, the analog deviation signal E5 from the adding circuit 18 is the analog deviation signal E5 of the negative polarity in the former half portion and changes to the analog deviation signal E5 of the positive polarity in the latter half portion. First, the comparing circuit 42 effectively operates with respect to the analog deviation signal E5 of the negative polarity in the former half portion. That is, the charging to the capacitor 48 by the constant current circuit 46 is started synchronously with the leading edge of the H level of the delayed phase signal E16. The ramp waveform signal E17 of the negative polarity is supplied to the comparing circuit 42 from the inverting amplifier 50. When the ramp waveform signal E17 increases to the minus side and reaches the level of the negative polarity analog deviation signal E5, the comparison output signal E19 of the comparing circuit 42 in FIG. 6E is obtained.

As shown in FIG. 6F, the flip-flop 56 is set in response to a leading edge of the delayed phase signal E16, thereby setting the (Q) output to the H level. When the comparison output signal E19 is obtained, the flip-flop 56 is reset, thereby setting the (Q) output to the L level. The PWM pulse signal E31 in the CW direction having a duty according to the level of the analog deviation signal E5 is outputted within the repetitive period of the PWM pulse that is determined by the delayed phase signal E16. In this instance, as shown in FIG. 6G, since the comparing circuit 44 receives the ramp waveform signal E18 of the positive polarity for the negative polarity analog deviation signal E5, the comparison output signal E20 is fixed to the L level.

With respect to the latter half portion in which the polarity of the analog deviation signal E5 was inverted from the negative polarity to the positive polarity, like an input of the comparing circuit 44 of FIG. 6G, when the ramp waveform signal E18 of the positive polarity derived by the charging of the capacitor 48 reaches the level of the analog deviation signal E5 of the positive polarity at that time, the comparison output signal E20 of FIG. 6H is obtained. Therefore, after the flip-flop 56 was set to Q=1 in response to the leading edge to the H level of the delayed phase signal E16 as shown in FIG. 6I, the flip-flop 56 is reset by the comparison output signal E20 and one PWM pulse signal E32 is generated. Further, with regard to the former half portion in which the analog deviation signal E5 is set to the negative polarity, as shown in FIG. 6J, the negative polarity detection signal E23 is set to the H level. With respect to the latter half portion in which the analog deviation signal E5 is set to the positive polarity, as shown in FIG. 6K, the positive polarity detection signal E24 from the positive polarity detecting circuit 66 is set to the H level. The negative polarity detection signal E23 becomes the switching signal in the CW direction. The positive polarity detection signal E24 becomes the switching signal in the CCW direction.

Figure 7:
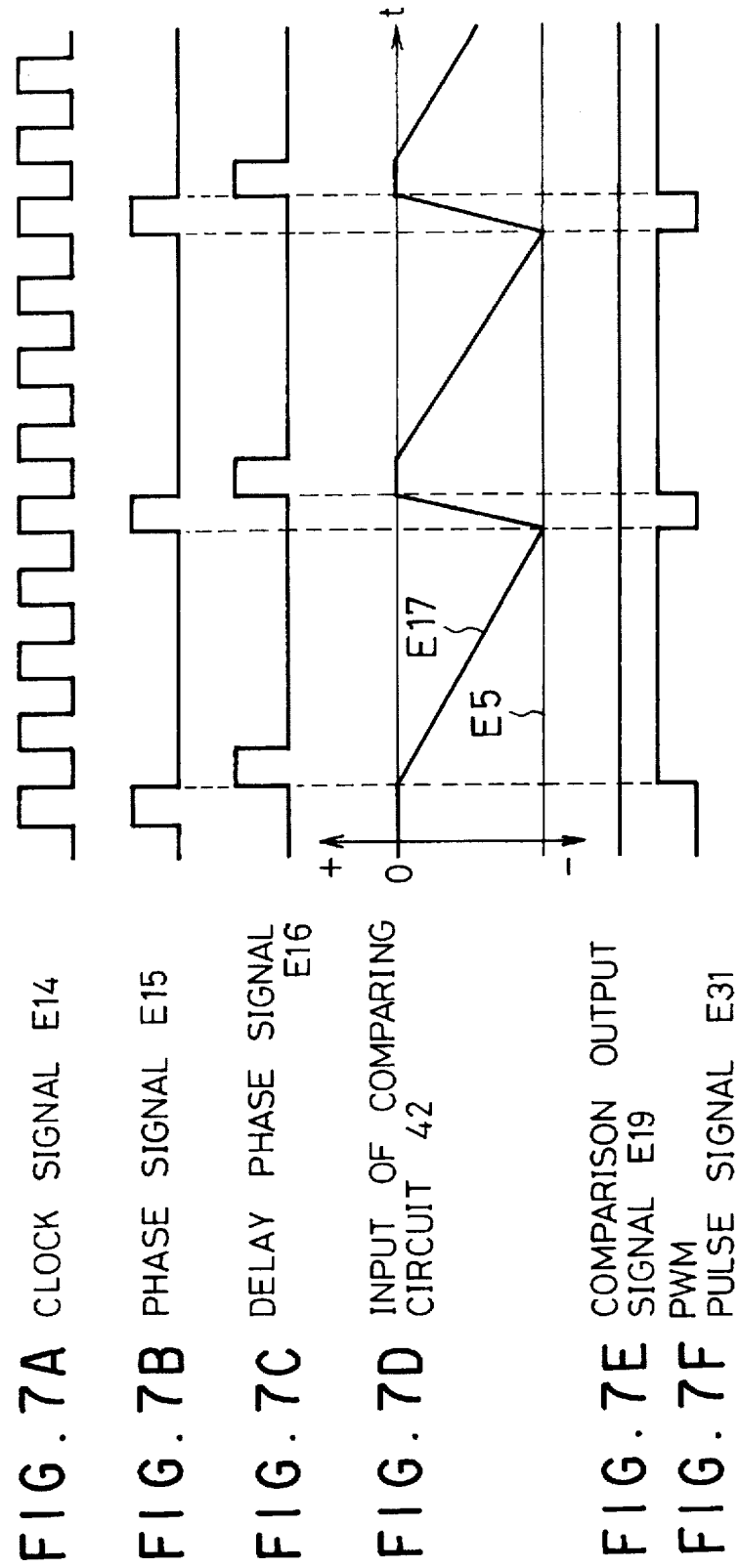
FIGS. 7A to 7F are timing charts for the pulse width modulating operation when a deviation signal is maximum.

FIGS. 7A to 7F show the PWM modulating operation when the deviation level reaches the maximum value with respect to the negative polarity analog deviation signal E5 as an example. As shown in FIG. 7D, when the negative polarity analog deviation signal E5 reaches the maximum level in the minus direction, the duty ratio theoretically becomes 100% and the comparison output signal E19 from the comparing circuit 42 is not derived. In the embodiment of FIG. 5, therefore, in correspondence to the duty ratio of 100%, the phase signal E15 is supplied to the reset terminals (R) of the flip-flops 56 and 58 through the OR gates 52 and 54. Accordingly, even if the comparison output signal E19 or E20 is not obtained, the flip-flops 56 and 58 are reset in response to the leading edge of the phase signal E15 and the upper limit of a delay cycle can be decided. Obviously, the resetting circuit 62 operates by the resetting of the flip-flops 56 and 58 by the phase signal E15, thereby discharge resetting the capacitor 48. A certain time is needed until the charges of the capacitor 48 are completely discharged and the terminal voltage is set to 0. The delayed phase signal E16 by the delay circuit 60 sets a time that is necessary to discharge the capacitor 48 to the zero voltage. That is, the delay time of the delayed phase signal E16 for the phase signal E15 is given as a time for discharge resetting the capacitor 48 to zero voltage. Thus, after one PWM pulse was generated, when the next PWM pulse is generated, the voltage of the capacitor 48 perfectly becomes zero and it is possible to certainly prevent that the voltage at the previous period remains and an error is caused in the generation of the PWM pulse at the next period.

Figure 8:
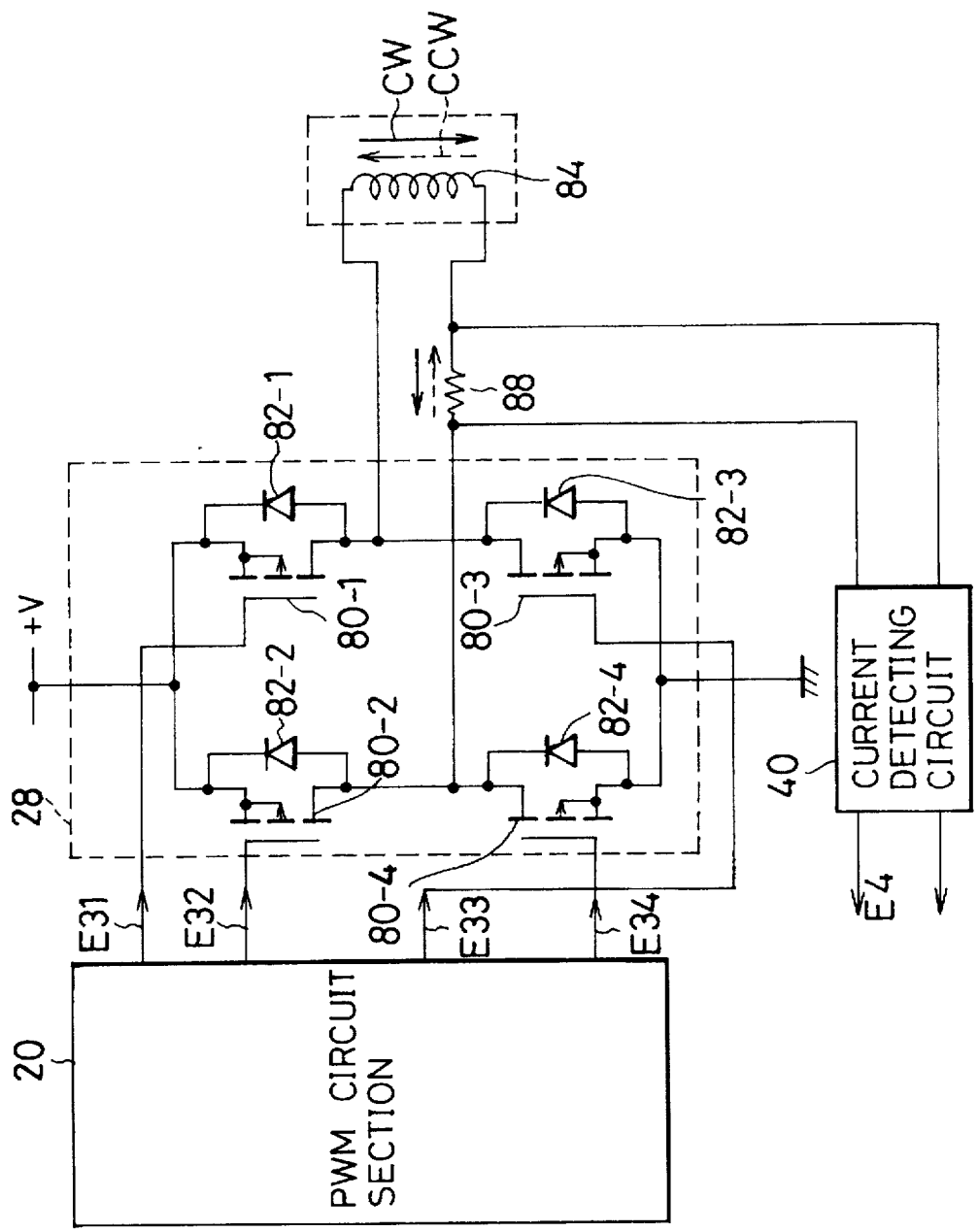
FIG. 8 is a circuit diagram of an embodiment of a power amplifier in FIG. 4.

FIG. 8 shows an embodiment of the power amplifier 28 in FIG. 4. In the embodiment, the DC motor 30 is a DC motor having a rotor coil 84 based on a brush switching and what is called a DC servo motor is generally used. A bridge type amplifier is used as a power amplifier 28 for supplying a drive current to the rotor coil 84. The bridge circuit of the power amplifier 28 has, for example, four FETs 80-1 to 80-4. The FETs 80-1 and 80-3 are serially connected and the FETs 80-2 and 80-4 are serially connected. Those two serial connection circuits are connected in parallel between a power source +V and the ground. The rotor coil 84 of the DC motor 30 is connected between the FETs 80-1 and 80-3 and between the FETs 80-2 and 80-4. Each of diodes 82-1 to 82-4 for obtaining a regenerative braking function in the braking mode is connected in parallel to each of the FETs 80-1 to 80-4 in the opposite direction. A current detecting resistor 88 is serially connected to the rotor coil 84 of the DC motor 30. The control signals E31, E32, E33, and E34 are inputted from the PWM circuit section 20 to gates of the FETs 80-1 to 80-4, respectively. The control signals E31 and E32 are the PWM pulse signals. The PWM pulse signal E31 is obtained by the CW driving. The PWM pulse signal E32 is derived by the CCW driving. On the other hand, in the normal mode, the control signals E33 and E34 are the switching signals for turning on the FET 80-3 or 80-4. By the instruction in the CCW direction, the control signal E33 is made effective, thereby turning on the FET 80-3. By the instruction in the CW direction, the control signal E34 is made effective, thereby turning on the FET 80-4.

In the braking mode, the same pulse signal as the PWM pulse signal E32 is outputted to the control signal E33 by the instruction in the CCW direction. The same pulse signal as the PWM pulse signal E31 in the CW direction is outputted to the control signal E34 by the instruction in the CW direction. Therefore, by the instruction in the CW direction in the normal mode, the PWM pulse signal E31 and the switching signal E34 are outputted. In the ON state of the FET 80-4, the FET 80-1 is turned on/off in accordance with the PWM pulse, thereby supplying a pulse current in the CW direction shown by an arrow of a solid line to the rotor coil of the DC motor 30. In this instance, a detection voltage of the polarity in which the right side is set to plus is generated across the current detecting resistor 88. The negative polarity analog instruction signal E3 is inputted to the adding circuit 18 by the instruction in the CW direction. Therefore, the current detecting circuit 40 inverts the input detection voltage and outputs the current feedback signal E4 of the positive polarity.

When the CCW direction is instructed in the normal mode, the PWM pulse signal E32 and switching signal E33 are made effective. Therefore, in the ON state of the FET 80-3, the FET 80-2 is on/off driven by the PWM pulse signal. Therefore, a pulse current in the CCW direction shown by an arrow of a broken line flows in the rotor coil 84 of the DC motor 30. In this instance, a detection voltage of the polarity in which the left side is set to plus is obtained across the current detecting resistor 88. In the CCW driving, since the analog instruction signal E3 to the adding circuit 18 in FIG. 4 has the positive polarity, the current detecting circuit 40 outputs the current feedback signal E4 of the negative polarity in which the detection voltage is inverted.

When the braking mode is instructed, for instance, in case of the CW direction, the control signals E31 and E34 becomes the same PWM pulse signal. Therefore, the FETs 80-1 and 80-4 are simultaneously turned on/off by the PWM pulse signal, when an attention is paid to the OFF timing in the case where the FETs 80-1 and 80-4 are simultaneously turned on or off, a regenerative braking circuit for supplying a drive current in the opposite direction while using the rotor coil 84 as a power source is formed by the diodes 82-1 and 82-4 connected in parallel to the FETs 80-1 and 80-4 in the OFF state. Therefore, the OFF timing of the FETs 80-1 and 80-4 in the braking mode causes a regenerative braking function to reduce a driving torque of the DC motor 30. The operation in the braking mode is also similarly executed with respect to the simultaneous on/off operations of the FETs 80-2 and 80-3 in case of the CCW direction. The operation in the braking mode of the DC motor 30 can be effectively utilized in a tension control in case of applying the invention to reel motors of a magnetic tape unit, which will be obviously explained hereinlater. A transistor can be also used as a power amplifier 28 as well as an FET. The diodes connected in parallel to the FETs don't need to be externally connected in the case where they are realized by a device structure of the FET.

[monitor of voltage and current]

Figure 9:
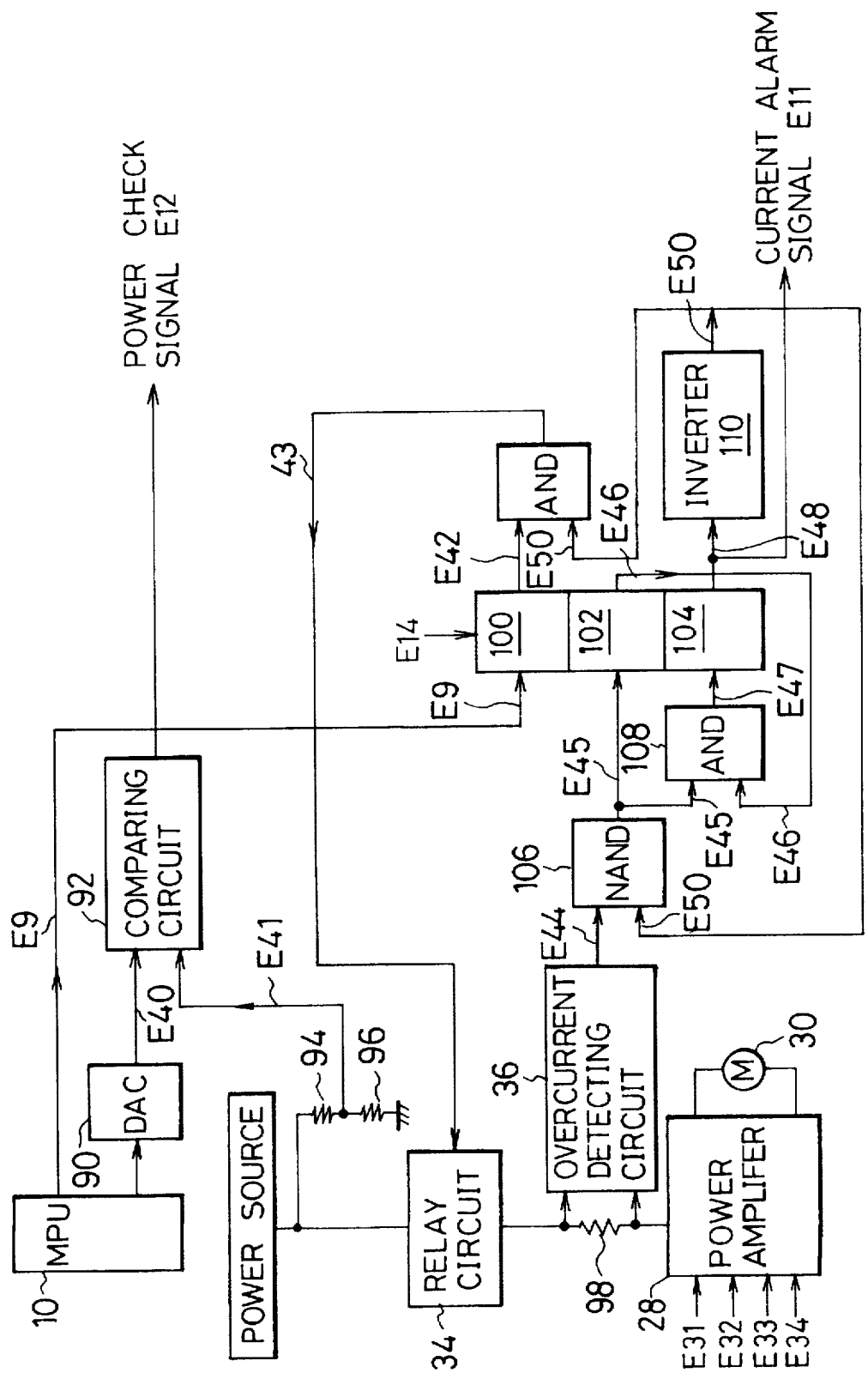
FIG. 9 is a circuit diagram of an embodiment of a voltage current monitoring circuit in FIG. 4.

FIG. 9 shows an embodiment of the voltage current monitoring circuit 38 in FIG. 4. First, with respect to a voltage monitor, a voltage detecting circuit comprising: a D/A converting circuit 90, a comparing circuit 92, and a voltage dividing circuit of resistors 94 and 96 is provided for the MPU 10. In an initial diagnosis routine such as a power-on start of the apparatus or the like prior to the motor activation, the MPU 10 outputs specified voltage reference data to the D/A converting circuit 90 and outputs a reference voltage E40 to the comparing circuit 92. The comparing circuit 92 compares a detection voltage E41 of the power source 32 divided by the resistors 94 and 96 and the reference voltage E40 from the D/A converting circuit 90. When the detection voltage E41 is equal to or exceeds the reference voltage E40, the power check signal E12 to the MPU 10 is at the L level and is invalid. When the detection voltage E41 is lower than the reference voltage E40, the comparison output of the comparing circuit 92 is valid and the power check signal E12 is outputted to the MPU 10. The MPU 10 which received the power check signal E12 generated when the power source voltage is lower than the reference voltage recognizes the highest rotational speed at which the DC motor can be rotated from the state of the power check signal E12. That is, when the DC motor rotates, a counter electromotive voltage that is proportional to the rotational speed is generated. In order to rotate the motor at a high speed, a high power source voltage which is proportional to the rotational speed is needed. Therefore, the MPU 10 can recognize the highest rotational speed of the motor which can be instructed by the MPU 10 at that time from the state of the power source voltage. Instead of the comparison between the reference voltage and the detection voltage, it is also possible to directly fetch the detection voltage E41 of the power source voltage to the MPU 10 via the A/D converting circuit and to judge the relation with the highest rotational speed.

The relay circuit 34 to control the turn-on of the power supply to the DC motor 30 will now be described. The relay circuit 34 is controlled by a flip-flop 100 and an AND gate 112. The enable signal E9 at the H level is inputted to the flip-flop 100 from the MPU 10 prior to the motor activation. The flip-flop 100 is set by the enable signal E9 at the H level synchronously with the clock signal E14 and outputs an H-level signal E42 to the AND gate 112. In the initial state, another input signal E50 to the AND gate 112 is at the H level. Therefore, when the output signal E42 of the flip-flop 100 is set to the H level, a relay drive signal E43 from the AND gate 112 is also set to the H level. Thus, the relay circuit 34 is driven and closes a relay contact, thereby supplying a DC power source from the power source 32 to the DC motor 30.

An overcurrent judgment circuit section will now be described. Subsequent to the relay circuit 34, an overcurrent detecting resistor 98 is serially connected. A detection voltage according to a motor drive current of the overcurrent detecting resistor 98 is inputted to the overcurrent detecting circuit 36. The overcurrent detecting circuit 36 outputs an overcurrent detection signal E44 which is changed from the H level to the L level when a detection voltage exceeding a preset overcurrent level is obtained to an NAND gate 106. The input signal E50 to the NAND gate 106 is at the H level in the initial state. Therefore, when the overcurrent detection signal E44 is set to the L level, an output signal E45 of the NAND gate 106 changes from the L level to the H level. When the output signal of the NAND gate 106 is at the H level, it sets a flip-flop 102. Therefore, the flip-flop 102 executes a latching operation by the first clock signal E14 after the overcurrent detection signal E44 was set to the L level. An output signal E46 is set to the H level. The output signal E46 of the flip-flop 102 is inputted to one input terminal of an AND gate 108. The output signal E45 from the NAND gate 106 is inputted to another input terminal of the AND gate 108. Therefore, in a state in which the first latching operation is executed in the flip-flop 102 by the clock signal E14 and the output signal E46 is at the H level, if the output signal E45 from the NAND gate 106 maintains an H-level state, an H-level output signal E47 from the AND gate 108 is latched at the second time by the setting operation of a flip-flop 104 in response to a leading edge of the next clock signal E14. An output signal E48 is set to the H level. The H-level output signal E48 of the flip-flop 104 is supplied to the MPU 10 as a current alarm signal E11. The H-level output signal E48 is inverted by an inverter 110, so that the output signal E50 is set to the L level. When the signal E50 is set to the L level, a signal to one input of the AND gate 112 is set to the L level, an output signal of the AND gate 112 is changed from the H level to the L level, and the relay drive signal E43 is set to the L level, so that the relay circuit 34 is turned off and the power supply is shut off.

On the other hand, when the first setting operation of the overcurrent detection is performed by the flip-flop 102 and the overcurrent detection signal E44 has been returned to the H level without performing the overcurrent detection at the time of the setting operation by the clock signal E14 at the second time, the output signal E45 of the NAND gate 106 is changed from the H level to the L level. Thus, the AND gate 108 enters an inhibition state, the setting operation synchronized with the next clock signal E14 by the flip-flop 104 is not executed, and the flip-flop 102 which has been set at the first time is reset. Therefore, so long as the L-level overcurrent detection signal E44 due to the overcurrent detection of the overcurrent detecting circuit 36 doesn't continue in excess of at least two periods of the clock signal E14, the overcurrent judgment result in which the current alarm signal E13 is set to the H level is not derived.

Figure 10:
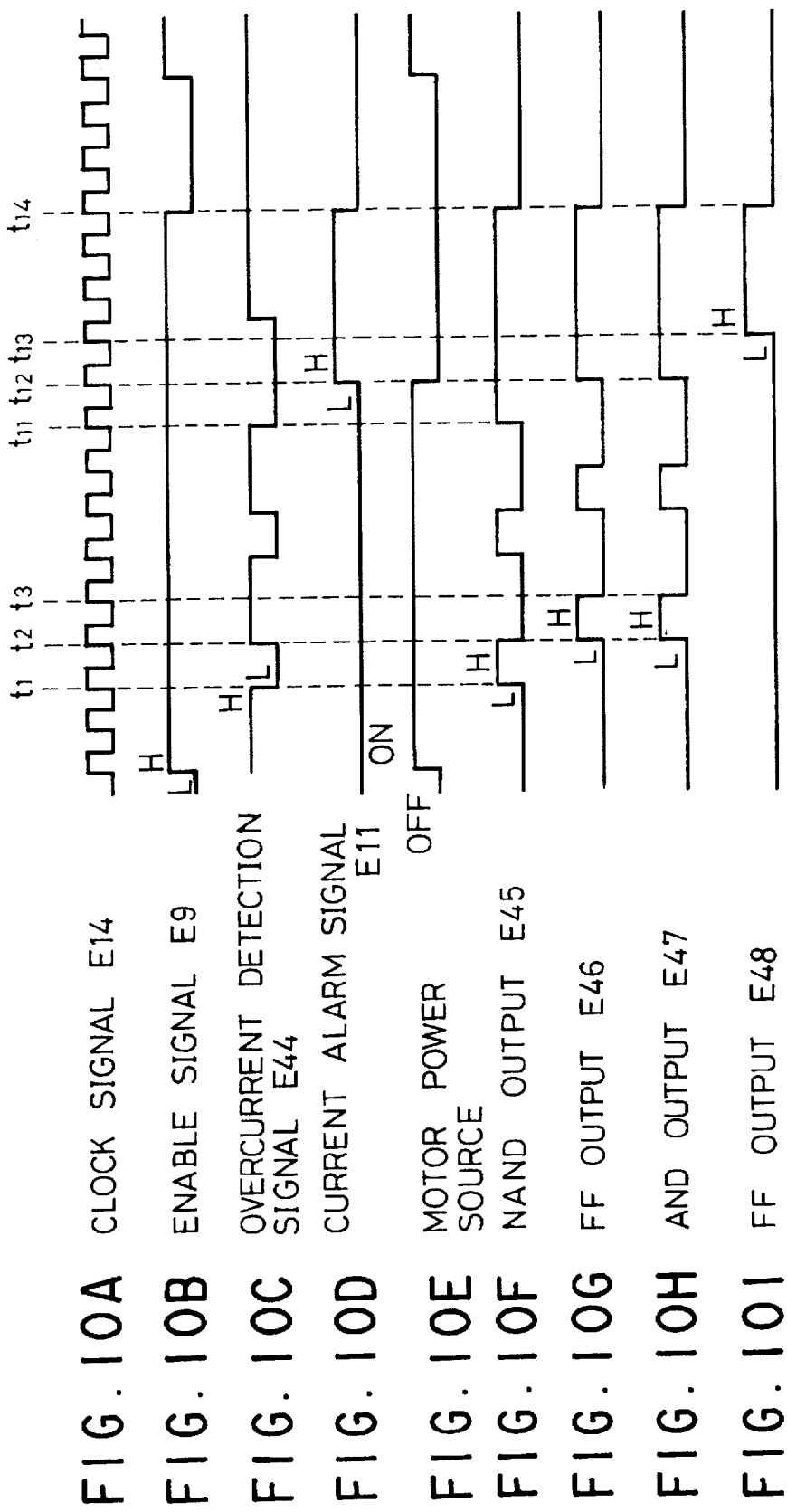
FIGS. 10A to 10I are timing charts for a detecting operation of an overcurrent in FIG. 9.

FIGS. 10A to 10I are timing charts for the overcurrent judging operation in FIG. 9. With respect to the overcurrent detection signal E44 of FIG. 10C for one clock period at a former half time interval of t1 to t2, the flip-flop (FF) output E46 by the setting at the first time by the flip-flop 102 in FIG. 10G is not obtained. With respect to the second clock at time t3, since the overcurrent detection signal E44 has already been returned to the H level, the FF output E48 by the latch at the second time by the flip-flop 104 in FIG. 10I is not obtained and the generation of an overcurrent is not judged. On the other hand, with respect to an L-level interval of the overcurrent detection signal E44 exceeding two clocks from time t11, the FF output E48 in FIG. 10I by the flip-flop 104 rises to the H level at the timing of the second clock of time t13. The current alarm signal E13 can be supplied to the MPU 10. The relay drive signal E43 is set to the L level and the relay circuit 34 is turned off. Thus, the power supply can be shut off. According to the overcurrent judgment circuit section of the invention, the overcurrent detection signal at a short period due to noises or the like is regarded as an erroneous detection, the generation of the current alarm signal is not performed, and the power recovery due to the shut-off of the relay circuit is not executed. For example, only for the intermittent overcurrent detection exceeding, for example, two clocks, the current alarm signal can be generated and the power source recovery by the relay-off can be performed.

[Tape tension control]

Figure 11:
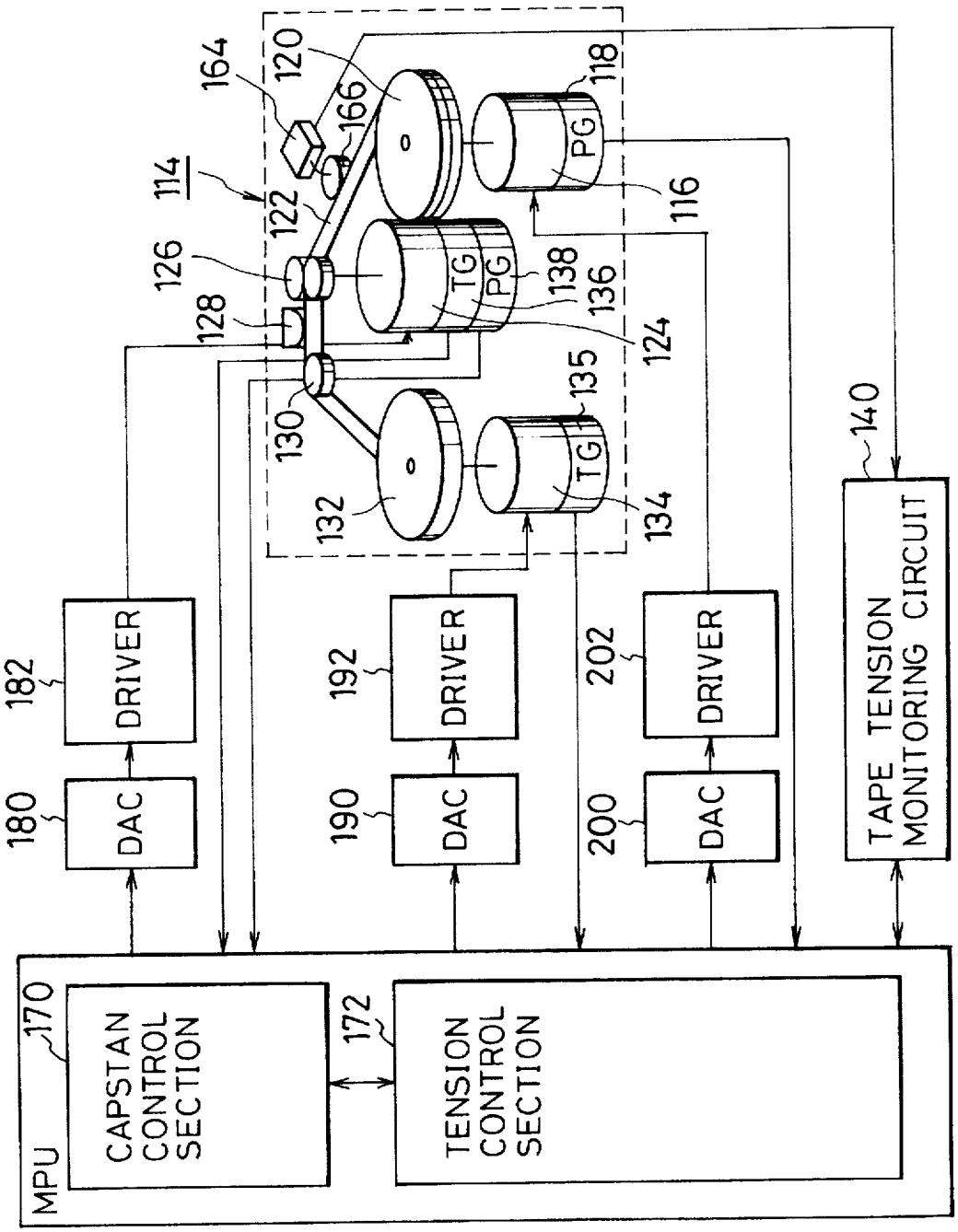
FIG. 11 is a block diagram of a tension control.

FIG. 11 shows a magnetic tape apparatus to which a DC motor driving circuit of the invention is applied. A magnetic tape running mechanism 114 includes: a file reel motor 116 attached with a file reel 120; and a machine reel motor 134 attached with a machine reel 132. The file reel 120 is a magnetic tape cartridge using, for example, a single reel. The file reel 120 is loaded into the magnetic tape unit and is set to the file reel motor 116. A magnetic tape 122 wound around the file reel 120 is pulled out by a threading mechanism (not shown) and passes through portions of a capstan 126 that is driven by a capstan motor 124 and, further, of a guide roller 130 and is wound around the machine reel 132. By rotating the capstan 126 at a predetermined speed, the capstan motor 124 runs the magnetic tape 122 at a constant speed for a recording and reproducing head 128. At the time of the constant-speed run for recording and reproduction of the magnetic tape 122 by the capstan motor 124, the machine reel motor 134 is driven in a normal mode. On the other hand, by driving the file reel motor 116 in a braking mode, a fundamental tape tension can be applied to the magnetic tape 122. A pulse generator 118 is provided for the file reel motor 116 and generates a pulse signal of, for example, 500 pulses for one rotation of the motor. On the other hand, a tacho generator 135 is provided for the machine reel motor 134 and generates one pulse for one rotation of the motor. A tacho generator 136 for generating one pulse for one rotation of the motor and a pulse generator 138 for generating, for example, 500 pulses for one rotation of the motor are provided for the capstan motor. A capstan control section 170 and a tape tension control section 172 are provided on the MPU 10 side. The capstan control section 170 outputs a digital signal of an instruction value (current instruction value) for the capstan motor 124 to a D/A converting circuit 180. The capstan motor 124 is feedback controlled by using a PWM pulse by a driver 182 having a circuit construction of the invention shown in FIG. 4. An instruction value for the file reel motor 116 is supplied from the tape tension control section 172 to a D/A converting circuit 200 and is converted into an analog instruction signal. After that, a feedback control based on the PWM pulse is performed by a driver 202 having a construction of FIG. 4.

Similarly, an instruction value to the machine reel motor 134 is converted to an analog instruction signal by a D/A converting circuit 190 and a feedback control using a PWM pulse is performed by a driver 192 having the circuit construction of FIG. 4. Further, a tape tension monitoring circuit 140 is provided for the tape tension control section 172. A detection signal indicative of the actual tape tension value detected by a tension sensor 164 provided for the tape running mechanism 114 is inputted to the tape tension monitoring circuit 140.

Figure 12:
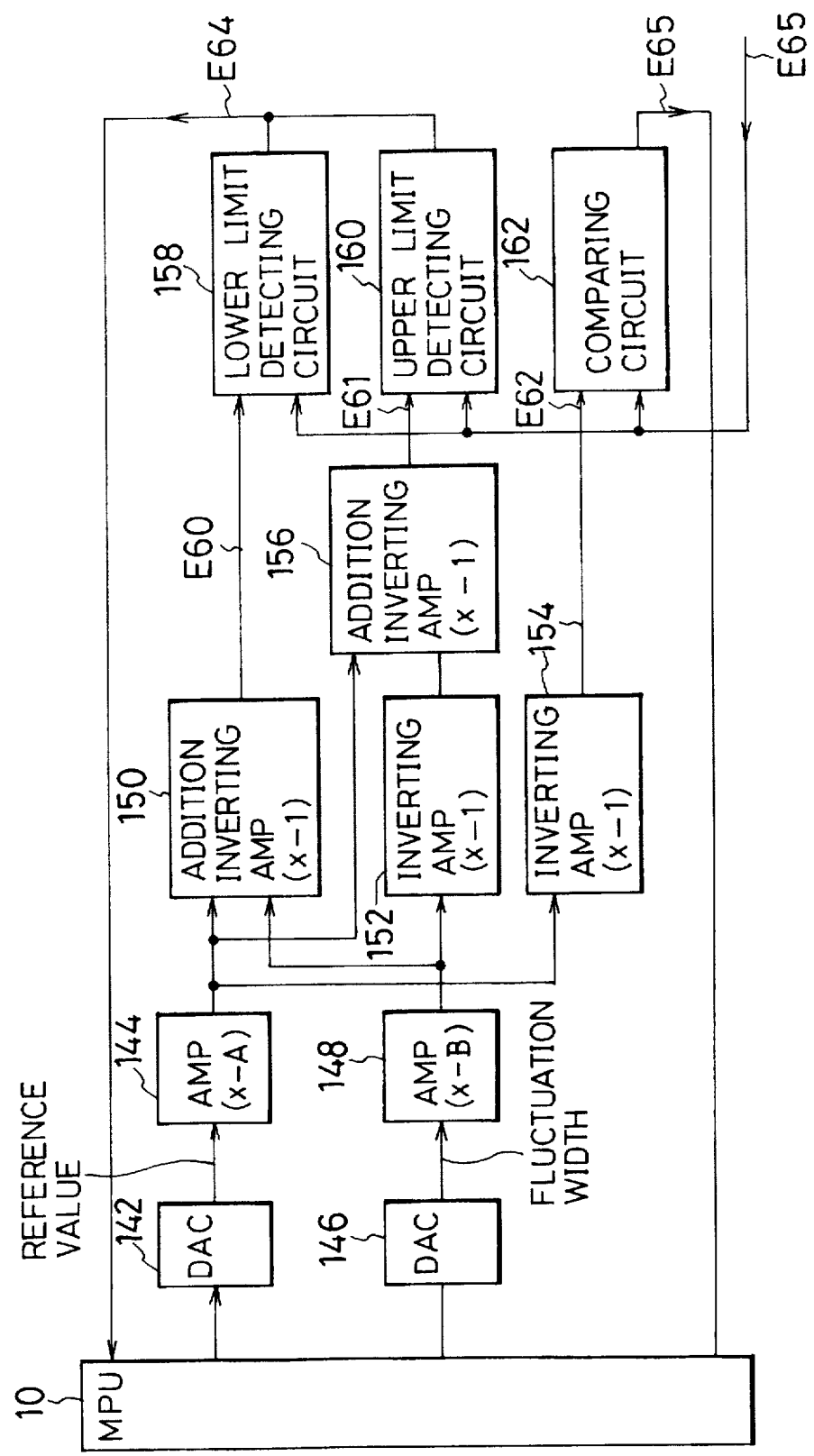
FIG. 12 is a circuit block diagram of an embodiment of a tape tension monitoring circuit in FIG. 11.

FIG. 12 shows an embodiment of the tape tension monitoring circuit 140 in FIG. 11. The MPU 10 outputs a reference value of the tape tension to a D/A converting circuit 142, by which it is converted to an analog reference value. After that, it is inverted and amplified by (A) times by an amplifier 144 and is supplied as a reference signal E62 to an addition inverting amplifier 150, an inverting amplifier 152, and an addition inverting amplifier 156, respectively. On the other hand, the MPU 10 outputs a fluctuation width of the tape tension around the tape tension reference value as a central value to a D/A converting circuit 146. An output signal is converted to an analog fluctuation width and is inverted and amplified by (B) times by an amplifier 148. After that, the resultant signal is outputted to the addition inverting amplifier 150 and the inverting amplifier 152. The addition inverting amplifier 150 adds a fluctuation width signal from the amplifier 148 to the reference signal E62 from the amplifier 144. The addition result is inverted, thereby obtaining a lower limit reference signal E60 in FIG. 13A. The signal E60 is outputted to a lower limit detecting circuit 158. The addition inverting amplifier 156 adds the fluctuation width signal inverted by the inverting amplifier 152 to the reference signal E62 from the amplifier 144 and further inverts the resultant addition signal, thereby forming an upper limit reference signal E61 in FIG. 13A and setting into an upper limit detecting circuit 160. Further, the inverted and amplified signal from the amplifier 144 is inverted by an inverting amplifier 154 and is inputted to a comparing circuit 162. An actual tape tension detection signal E63 detected by the tension sensor 164 in FIG. 11 is inputted to the lower limit detecting circuit 158, upper limit detecting circuit 160, and comparing circuit 162.

Figure 13:
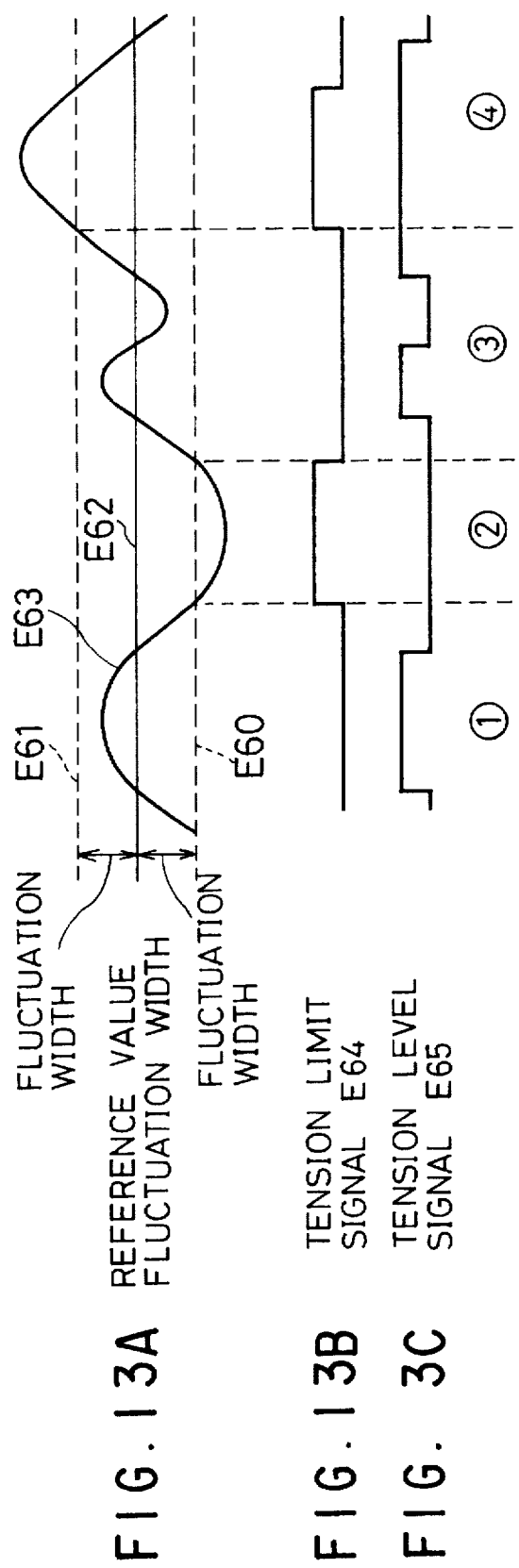
FIGS. 13A to 13C are timing charts for a tape tension monitoring operation of FIG. 12.

When it is now assumed that the tape tension detection signal E63 detected actually changed as shown in FIG. 13A, a tension limit signal E64 in FIG. 13B is outputted to the MPU 10 as a synthetic output signal of the lower limit detecting circuit 158 and upper limit detecting circuit 160. A tension level signal E65 in FIG. 13C is outputted from the comparing circuit 162 to the MPU 10. The tension limit signal E64 in FIG. 13B is set to the H level at a timing of (2) at which the tension detection signal E63 is lower than the lower limit reference signal E60 and at a timing of (4) at which the tension detection signal E63 is higher than the upper limit reference signal E61. The tension level signal E65 in FIG. 13C is held at the H level for a period of time during which the tension detection signal E63 is equal to or higher than the reference signal E62. The signal E65 is set to the L level when the signal E63 is lower than the reference signal E62. It is judged that the tension control is normal for a period of time during which the tension detection signal E63 lies within a range from the lower limit reference signal E60 and the upper limit reference signal E61 and the tension limit signal E64 is held at the L level.

On the other hand, when the tension limit signal E64 is at the H level while the tape tension exceeds the range of the fluctuation width, it is judged that the tape tension is abnormal. When the tape tension is equal to or larger than the fluctuation width, so long as the tape tension level signal E65 obtained at that time is at the L level, it is judged that the tension detection signal is lower than the lower limit. When the signal E65 is at the H level, it is judged that the tension detection signal is equal to or larger than the upper limit. In accordance with the judgment result, when the tension exceeds the fluctuation width and is low, the reel motor is driven so as to raise the tension, and when the tension is equal to or higher than the fluctuation width and is high, the reel motor is driven so as to weaken the tension.

A constant speed control of the tape run of the file reel motor 116 and machine reel motor 134 by the tape tension control section 172 in the processor 10 in FIG. 11 will now be described. First, a relation between a speed Vf of the file reel motor and a speed Vm of a machine reel motor in the tape run will be explained. It is now assumed that in a state in which the cartridge has been loaded as a file reel 120, the tape was run from the begin of tape (BOT) side to an end of tape (EOT) side. First, since all of the magnetic tapes exist in the file reel 120, a radius Rf of the file reel is maximum. On the contrary, since the machine reel is empty, the radius of the reel is minimum. Therefore, for a constant tape run control by the capstan motor 124, the machine reel speed Vm is first large and the file reel speed Vf is small. When the tape run advances toward the FWD direction of the tape, the file reel radius Rf on the supply side is linearly decreased. At the same time, a radius Rm of the machine reel on the take-up side linearly increases. For such a change in reel radius, the machine reel speed Vm on the supply side has to be contrarily linearly decreases. The file reel speed Vf on the take-up side has to be linearly increased. As will be obviously understood from the above relation, as for the speed control of the file reel motor, the reel speed on the supply side has to be decelerated in accordance with changes in reel radii on the supply side and the take-up side and the reel speed on the take-up side has to be accelerated. In each speed control, the reel radius at that time has to be detected in a real-time manner.

Figure 14:
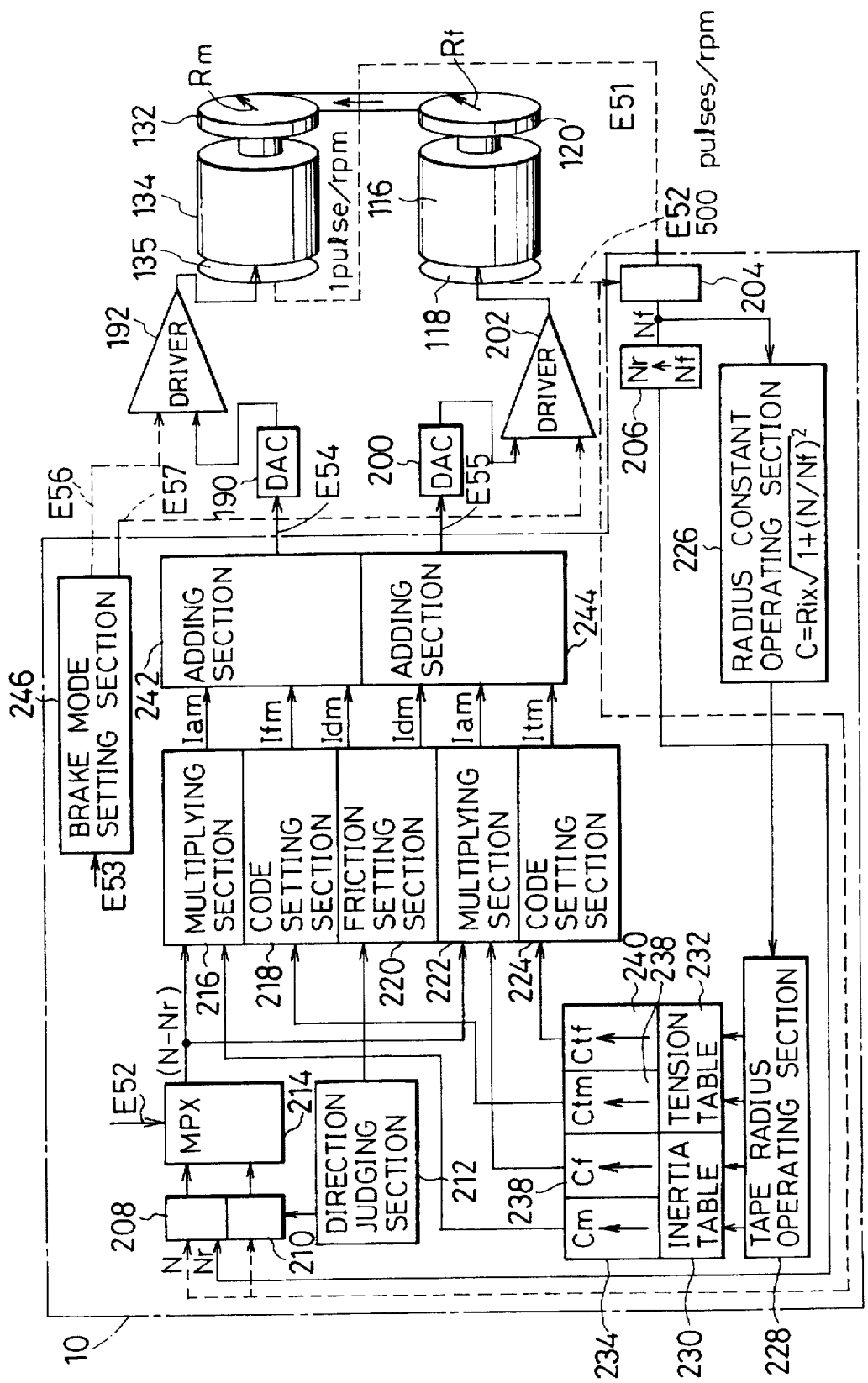
FIG. 14 is a functional block diagram of a tape tension control section by a processor in FIG. 12.

In the processor 10 in FIG. 14, a drive current If of the file reel motor 116 and a drive current Im of the machine reel motor 134 are defined by the following equations.

$$If = \text{(inertia table value)} \cdot \text{(servo error)} + \quad (1)$$
$$\text{(tension table value } Cf) \pm$$
$$\text{(frictional term } Cdf)$$
$$= Cf \cdot (N - Nr) + \frac{Ft \cdot Rf}{Kt} \pm \frac{Fvf + Fcf}{Kt}$$

where,

Cf: Inertia table value
N: Count value between index pulses (one rotation)
Nr: Reference count value of one rotation
Ft: Tape tension [kg]
Rf: Tape radius of file reel
Kt: Torque constant [kg cm/A]
Fvf: Viscos friction torque load that is applied to the motor [kg cm]
Fcf: Coulomb (inertia) friction torque load which is applied to the motor [kg cm]

$$Im = \text{(inertia table value } Cm) \cdot \text{(servo error } \Delta N) + \quad (2)$$
$$\text{(tension table value } Ctm) \pm$$
$$\text{(friction term } Cdm)$$
$$= Cm \cdot (T - Tr) + \frac{Ft \cdot Rm}{Kt} \pm \frac{Fvm + Fcm}{Kt}$$

where,

Cm: Inertia table value

N: Count value between index pulses (one rotation)

Nr: Reference count value of one rotation

Ft: Tape tension [kg]

Rm: Tape radius of machine reel

Kt: Torque constant [kg cm/A]

Fvm: Viscos friction torque load which is applied to the motor [kg cm]

Fcm: Coulomb (inertia) friction torque load which is applied to the motor [kg cm]

With respect to the tension value and friction term of the second term of the right side in the equations (1) and (2), the addition and subtraction are determined as follows.

| Rotating direction | Tension value on machine side | Tension value on reel side | Friction term |
| --- | --- | --- | --- |
| FWD | Addition | Subtraction | + |
| REV | Subtraction | Addition | − |

The processor 10 in FIG. 14 will now be described with respect to the drive current If of the file reel motor 116 of the equation (1) as an example. First, the inertia table value Cf of the first term of the right side of the equation (1) is obtained from an inertia table 230. A retrieval of the inertia table 230 is performed by using the file reel radius at that time obtained by a tape radius operating section 228 as an address. A deviation as a servo error of the second term of the right side of the equation (1) is obtained from a counter 208. A rotation pulse signal E52 in which, for example, 500 pulses are generated per one rotation from the pulse generator 118 provided for the file reel motor 116 is supplied to the counter 208. A count value Lr which gives a reference period is supplied from a register 206 to the counter 208. A value of a counter 204 of one period before is held in the register 206. Each time an index pulse signal E51 in which one pulse is generated per one rotation from the tacho generator 135 provided for the machine reel motor 134 is obtained, the counter 204 counts the rotation pulse signal E52 from the pulse generator 118 provided for the file reel motor 116. That is, a count value indicating how many times the file reel motor 116 rotates for a period of time during which the machine reel motor 134 rotates once is obtained. The count value of the counter 204 is set into the counter 208 by the register 206 as a reference count value at the next period. The counter 208 subtracts a count value of the rotation pulse signal E52 indicative of the present rotational speed of the file reel motor 116 from the reference count value Nr at every rotating period of the machine reel motor 134, thereby obtaining a deviation (N−Nr). The deviation (N−Nr) is supplied to a multiplying section 222 through a multiplexer 214 and is multiplied with the inertia table value Cf from the inertia table 230 that is obtained from a register 236. The result is outputted to an adding section 244 as a value Iaf of the first term of the right side of the equation (1).

A tension table 232 is provided adjacent to the inertia table 230. The tension table value Ctf of the second term of the right side of the equation (1) has previously been stored in the tension table 232 by using the file reel radius Rf as an address. Therefore, the tension table value Ctf is read out from the tension table 232 by an address by the file reel radius Rf obtained by the tape radius operating section 228 at the present time point and is stored into a register 240. The value Ctf of the register 240 is supplied to a code setting section 224. In this instance, since the FWD direction has been set, a minus sign is set in order to perform a subtraction and the resultant value is outputted to the adding section 244. Further, a friction setting section 220 is provided. The value Cdf of the friction term is fixedly set to the friction setting section 220. The above value is also set to the same value with respect to the machine reel motor 134 side. On the basis of a direction judgment signal from a direction judging section 212, the friction setting section 220 sets a plus sign for the FWD direction and sets a minus sign for the REV direction and outputs to the adding section 244. The adding section 244 adds each term of the right side of the equation (1). As an addition result, digital data of the current value If for the file reel motor 116, namely, current instruction data E55 is outputted to the D/A converter 200.

As for current instruction data E55 to the D/A converter 200, for instance, assuming that a current value per one step of the D/A converter 200 is equal to 25 [mA/step], the current value If calculated by the adding section 244 is divided by 0.025, thereby obtaining a decimal number of input steps. The step number is converted to the binary data and is outputted. That is, the current values If and Im calculated by the adding section 244 and 242 are converted by the D/A converters 200 and 190 by the following equations.

$$FADC = If/0.025 \text{ [STEP]}$$

$$MADC = Im/0.025 \text{ [STEP]} \quad (3)$$

The same construction is also used with respect to the current value Im of the machine reel motor 134 shown in the equation (2). That is, the inertia table value Cm of the first term of the right side of the equation (2) is read out from the inertia table 230 to a register 234 by the present machine reel radius Rm obtained by the tape radius operating section 228. The inertia table value Cm is multiplied with the deviation (N−Nr) obtained from the counter 208 through the multiplexer 214 by a multiplying section 216. A multiplication value Iam is outputted to the adding section 242. A tension table value Ctm of the second term of the right side of the equation (2) is read out from the tension table 232 to a register 238 on the basis of the machine reel radius Rm at that time. An addition sign or a subtraction sign is set by the sign setting section 218 and the resultant value is outputted to the adding section 242. Further, the friction term Cdm due to the addition or subtraction based on the direction at that time judged by the direction judging section 212 is set into the adding section 242 from the friction setting section 220. The adding section 242 adds each term of the right side of the equation (2) and obtains the current value Im. After that, the current value Im is converted to decimal data according to a resolution of the D/A converter 190 in accordance with the equation (3) and is further converted to binary data. The binary data is outputted to the D/A converter 190.

The inertia table values Cf and Cm of the first term of the right side of the equations (1) and (2) stored in the inertia table 230 will now be described. The inertia table values Cf and Cm are given by the following equations.

$$Cf = \frac{4 \cdot Af}{Nr \cdot Kt} \cdot \left[ \frac{C1(Rf^4 - C2)}{Rf} + \frac{Jef}{Rf} + \frac{Jrf}{Rf} \right] \quad (4)$$

where,

Acf: Highest acceleration of file motor

C1: Constant which is given by $(\pi \cdot \rho \cdot w)/2$ where, $\rho$ is a density of tape and w is a tape width C2: constant that is given by the fourth power of minimum radius Ri of tape Rf: Tape radius of file reel Jef: Inertia when reel is empty Jrf: Inertia of rotor of motor $$Cm = \frac{4 \cdot Acm}{Nr \cdot Kt} \cdot \left[ \frac{C1(Rm^4 - C2)}{Rm} + \frac{Jem}{Rm} + \frac{Jrm}{Rm} \right] \quad (5)$$

where,

Acm: Highest acceleration of machine motor

C1: Constant which is given by $(\pi \cdot \rho \cdot w)/2$ where, $\rho$ is a density of tape and w is a tape width C2: Constant that is given by the fourth power of tape minimum radius Ri Rm: Tape radius of machine reel Jem: Inertia when reel is empty Jrm: Inertia of rotor of motor As will be obviously understood from the equations (4) and (5), in order to obtain the inertia values Cf and Cm, it is necessary to obtain the tape radius Rf of the file reel and the tape radius Rm of the machine reel. The tape radii Rf and Rm are obtained by a radius constant operating section 226 and the tape radius operating section 228.

According to the invention, the tape radii Rf and Rm are calculated by using the index pulse signal E51 from the tacho generator 135 in which one pulse is obtained by one rotation of the machine reel motor 134 and the rotation pulse E52 from the pulse generator 118 for generating, for instance, 500 pulses per one rotation provided for the file reel motor 116.

Now, assuming that the number of rotation pulses of the file reel 120 which is obtained by one rotation of the machine reel 132 is set to Nf and the number of pulses per one rotation of the machine reel 132 is set to Nm, the radii Rf and Rm of the reels are obtained by the following equations.

$$Rf = C/\sqrt{\{1 + (Nf + N)^2\}} \quad (6)$$

$$Rm = C/\sqrt{\{1 + (Nf + N)^2\}} \quad (7)$$

where,

C: Radius constant

Nf: The number of rotation pulses of file reel which are obtained by one rotation of machine reel N: The number of pulses per one rotation of file reel Now, assuming that the maximum tape radius when all of the tapes were picked up by the file reel 120 and machine reel 132 is set to R0 and the minimum tape radius, namely, reel radius when all of the tapes are wound is set to Rr, a radius constant (C) in the equations (6) and (7) are given by the following equation.

$$\begin{aligned} C &= \sqrt{(R0^2 + Ri^2)} \\ &= Ri\sqrt{\{1 + (N/Nf)^2\}} \end{aligned} \quad (8)$$

where,

R0: Maximum tape radius

Ri: Minimum tape radius (reel radius)

Therefore, the radius constant operating section 226 obtains the radius constant (C) according to the equation (8) by using the number (Nf) of rotation pulses of the file reel 120 per one rotation of the machine reel 132 which is obtained by the counter 204. The constant (C) is outputted to the tape radius operating section 228. The tape radius operating section 228 obtains the file reel radius Rf by the equation (6) and obtains the machine reel radius Rm by the equation (7). An address in the inertia table 232 is designated by the reel radii Rf and Rm and the inertia table values Cf and Cm and the tension table values Ctf and Ctm can be also read out.

On the other hand, the current instruction value in the constant speed control is set to a relatively low current value. Therefore, the resolution is insufficient when the tape tension of about 200 to 300 g is controlled by the back tension control of the reel motor on the supply side, namely, by the control of the current instruction value. Accordingly, the braking mode to simultaneously turn on/off the FETs on the outflow side and inflow side by the pulse width control signal is set to the motor on the supply reel side, so that a proper back tension control can be performed.

According to the invention as mentioned above, after the instruction value of the motor current from the processor was D/A converted, two analog instruction signals of the positive polarity and negative polarity are produced, the analog signal of the negative polarity in the CW direction and the positive polarity in the CCW direction for the instruction of the rotating direction from the processor is selected, and the current feedback signal as a detection result by the current detecting resistors which are serially connected to the motor is added to the analog signal, so that the feedback which always causes a negative feedback for the analog instruction signal is performed without needing the circuit switching. Therefore, since a response delay occurring by the polarity switching of the feedback signal for the negative feedback control in the conventional apparatus doesn't occur, the feedback control becomes stable and the additional control by the motor driving can be executed more accurately. Since the drive pulse by the pulse width modulation is individually produced every rotating direction in accordance with the polarity of the analog deviation signal, an efficient feedback control in which the motor rotating direction is automatically decided by the hardware in accordance with the polarity of the analog deviation signal can be performed.

With respect to the charge/discharge control of the capacitor to obtain the ramp waveform signal that is used for generation of the PWM pulse, after the capacitor was completely discharged to the zero voltage within the repetitive period of the PWM pulse, the ramp waveform voltage of the next period is generated, so that the drive pulse by the pulse width modulation of a high precision can be produced.

Further, with regard to the motor driving by the bridge type power amplifier, the PWM pulse which was independently formed in accordance with the rotating direction and the switching signal in each direction have individually been inputted to the four switching devices such as FETs or the like constructing the bridge circuit and the apparatus has been operated. Therefore, even if the rotating direction is switched, the generation of the short current due to the simultaneous turn-on of the pair of switching devices connected serially in the bridge circuit can be certainly prevented. The efficient pulse driving of the motor can be realized.

Moreover, in a manner similar to the switching devices on the inflow side, the switching devices on the outflow side of the bridge circuit in the power amplifier are simultaneously driven by the PWM pulse. Thus, the regenerative braking circuit is formed at the OFF timing and the driving torque can be reduced as compared with that in the normal mode. Such a braking mode can be used for tension control in the reel motor of, for instance, the magnetic tape run control.

In addition, by monitoring the power source voltage to the power amplifier for driving the motor, the highest rotational speed of the motor is recognized, a situation such that a rotational speed than it is needed is set and the motor rotation is unnecessarily saturated can be prevented, and the motor rotational speed can be controlled to the optimum value.

Even if the current flowing in the motor driving circuit momentarily exceeds an overcurrent value or exceeds the overcurrent value due to noises or the like, so long as the overcurrent detection is not continuously performed for a predetermined time, the shut-off of the current supply and the notification of an alarm to the processor are not executed. Thus, the unnecessary overcurrent detection can be eliminated and the driving circuit can be certainly protected by the overcurrent detection which continues for a predetermined time.

By setting the reference value and fluctuation width of the tape tension from the processor, the actual fluctuation state of the tape tension can be monitored, and the tape tension is controlled to be constant on the basis of the monitoring result. The recording and reproduction by the stable tape run can be executed. Further, the life of the tape can be increased.

The DC motor control apparatus in the invention is not limited to the above magnetic tape apparatus but can be widely applied to proper apparatuses which need a high precision motor control such as accessor driving motor of a library apparatus, paper feed driving motor of a printer apparatus, driving motor of a robot hand of an NC apparatus, or the like. The invention is also not limited to the numerical values shown in the embodiment but many other various numerical values can be also used.

What is claimed is:

1. A DC motor control apparatus for switching a rotating direction and controlling a DC motor, comprising:

a processor for instructing various controls upon motor driving;

a D/A converting circuit for converting a digital signal of a current instruction value from said processor to an analog signal of a positive polarity;

an inverting circuit for inverting said analog signal of said D/A converting circuit and outputting an analog instruction signal of a negative polarity;

a selecting circuit for selecting the analog instruction signal of the negative polarity from said D/A converting circuit by an instruction of one rotating direction from said processor and for selecting the negative polarity analog instruction signal from said inverting circuit by an instruction of another rotating direction from said processor;

an adding circuit for adding an output signal of said selecting circuit and a negative feedback signal detected by a motor current detecting circuit and for outputting a deviation signal;

a pulse width modulating circuit for generating a first pulse width modulation signal of a duty ratio according to a negative polarity level in the case where said deviation signal has a negative polarity, and for generating a second pulse width modulating signal of a duty ratio according to a positive polarity level in the case where said deviation signal has a positive polarity;

a rotating direction setting circuit for outputting a first switching signal in one rotating direction when the negative polarity of said deviation signal is detected and for outputting a second switching signal in another rotating direction when a positive polarity of said deviation signal is detected;

a motor driving circuit, to which an electric power is supplied from a DC power source, for driving the DC motor on the basis of a pulse signal of said pulse width modulating circuit and the switching signal in another rotating direction setting circuit; and wherein said pulse width modulating circuit includes:

a repetitive period setting circuit for generating a phase signal to set a repetitive period of the pulse width modulation signal synchronized with a clock signal;

a ramp waveform forming circuit for generating a ramp waveform signal of a positive polarity at every predetermined period synchronized with said phase signal;

an inverting circuit for inverting a ramp waveform signal of said ramp waveform forming circuit and for outputting a negative polarity ramp waveform signal;

a first comparing circuit for comparing said negative polarity ramp waveform signal of said inverting circuit and said deviation signal and for generating a first comparison output when said negative polarity ramp waveform signal exceeds a negative polarity level of the deviation signal;

a second comparing circuit for comparing a positive polarity ramp waveform signal of said ramp waveform forming circuit and said deviation signal and generating a second comparison output when said positive polarity ramp waveform signal exceeds a positive polarity level of said deviation signal;

a first pulse generating circuit for generating a first pulse width control signal which is set by said phase signal and is reset by said first comparison output; and a second pulse generating circuit for generating a second pulse width control signal which is set by said phase signal and is reset by said second comparison output.

2. An apparatus according to claim 1, wherein said repetitive period setting circuit has a delay circuit for generating a delayed phase signal obtained by delaying said phase signal by only a time corresponding to a predetermined number of clocks, and said first and second pulse generating circuits are set by said delayed phase signal and are reset by an earlier one of said first and second comparison outputs after the setting and said phase signal.

3. An apparatus according to claim 1, wherein said ramp waveform forming circuit includes:

a capacitor which is charged by a constant current of a constant current circuit and generates a ramp voltage; and a resetting circuit for starting a discharge of said capacitor by an output of said first or second pulse based on said delayed phase signal and for discharging said capacitor by a stop of the output of said first or second pulse.

4. An apparatus according to claim 1, wherein said motor driving circuit is a bridge type driving circuit in which two sets of circuits each of which is constructed by serially connecting a pair of switching devices are connected in parallel, the pair of switching devices arranged at diagonal positions are controlled by said first pulse width control signal and said first direction setting signal, thereby supplying a current in a predetermined direction to said DC motor, and the pair of switching devices arranged at the other diagonal positions are controlled by said second pulse width control signal and said second direction setting signal, thereby supplying a current in an opposite direction to said DC motor.

5. An apparatus according to claim 4, wherein said motor driving circuit includes:

a switching circuit for simultaneously turning on/off both of the pair of switching devices arranged at the diagonal positions by said first or second pulse width control signal when a braking mode is instructed from said processor; and diodes connected in parallel in an opposite direction to each of said switching devices forming a regenerative braking circuit by supplying a current in the opposite direction to the motor for an OFF period in the simultaneous driving of said pair of switching devices.

6. An apparatus according to claim 1, further including a voltage monitoring circuit for monitoring a power source voltage to be supplied to said DC motor, and wherein said processor sets a rotational speed of said DC motor on the basis of a monitoring result of said voltage monitoring circuit.

7. An apparatus according to claim 1, further including:

an overcurrent circuit for detecting an overcurrent flowing in said DC motor;

an overcurrent judging circuit for outputting a current alarm signal when a detection signal of said overcurrent detecting circuit continues in excess of a predetermined time; and a circuit for turning on/off a power supply to said DC motor by an instruction from said processor and, further, shutting off the power supply to said DC motor by said current alarm signal.

8. A DC motor control apparatus for switching a rotating direction and controlling a DC motor, comprising:

a processor for instructing various controls upon motor driving;

a D/A converting circuit for converting a digital signal of a current instruction value from said processor to an analog signal of a positive polarity;

an inverting circuit for inverting said analog signal of said D/A converting circuit and outputting an analog instruction signal of a negative polarity;

a selecting circuit for selecting the analog instruction signal of the negative polarity from said D/A converting circuit by an instruction of one rotating direction from said processor and for selecting the negative polarity analog instruction signal from said inverting circuit by an instruction of another rotating direction from said processor;

an adding circuit for adding an output signal of said selecting circuit and a negative feedback signal detected by a motor current detecting circuit and for outputting a deviation signal;

a pulse width modulating circuit for generating a first pulse width modulation signal of a duty ratio according to a negative polarity level in the case where said deviation signal has a negative polarity, and for generating a second pulse width modulation signal of a duty ratio according to a positive polarity level in the case where said deviation signal has a positive polarity;

a rotating direction setting circuit for outputting a first switching signal in one rotating direction when the negative polarity of said deviation signal is detected and for outputting a second switching signal in another rotating direction when a positive polarity of said deviation signal is detected;

a motor driving circuit, to which an electric power is supplied from a DC power source, for driving the DC motor on the basis of a pulse signal of said pulse width modulating circuit and the switching signal of said rotating direction setting circuit; and wherein said DC motor is a reel motor provided for each of a pair of reels for running a magnetic tape and said processor is a tape tension control section for instructing to supply a current to each of said reel motors so as to apply a predetermined tape tension and further wherein said apparatus also includes:

a setting circuit for setting a tape tension reference value;

a comparing circuit for comparing said tape tension reference value and an actual tape tension value detected by a sensor and for outputting to said tape tension control unit a comparison result regarding whether said actual tape tension value has exceeded said reference value;

a fluctuation width setting circuit for setting a fluctuation width of the tape tension to said reference tape tension value; and a judging circuit for judging whether the actual tape tension value detected by said sensor lies within said tape tension fluctuation width and for outputting a judgement result to said tape tension control section, and wherein the tape tension is controlled by said tape tension section so as to be constant.

* * * * *

UNITED STATES PATENT AND TRADEMARK OFFICE
CERTIFICATE OF CORRECTION

PATENT NO. : 5,731,672
DATED : March 24, 1998
INVENTOR(S) : Ryuichi Miyaguchi

It is certified that error appears in the above-identified patent and that said Letters Patent is hereby corrected as shown below:

Column 12, line 7, delete "signal," and insert

--signal.-- therefor

Column 22, line 2, delete "in another" and insert --of said-- therefor

Column 24, line 27, after "tension" insert

--;--

Signed and Sealed this

Eighth Day of September, 1998

Attest:

BRUCE LEHMAN

Attesting Officer       Commissioner of Patents and Trademarks